US011170546B2

(12) United States Patent
Usuki

(10) Patent No.: US 11,170,546 B2
(45) Date of Patent: Nov. 9, 2021

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventor: Masaya Usuki, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 192 days.

(21) Appl. No.: 16/581,984

(22) Filed: Sep. 25, 2019

(65) Prior Publication Data

US 2020/0105038 A1   Apr. 2, 2020

(30) Foreign Application Priority Data

Sep. 28, 2018  (JP) .............................. JP2018-184337

(51) Int. Cl.
*G06T 11/60* (2006.01)
*G06K 9/20* (2006.01)
*H04N 1/00* (2006.01)

(52) U.S. Cl.
CPC ............ *G06T 11/60* (2013.01); *G06K 9/2081* (2013.01); *H04N 1/00196* (2013.01); *G06T 2207/20092* (2013.01)

(58) Field of Classification Search
CPC .......... G06T 11/60; G06T 2207/20092; G06K 9/2081; H04N 1/00196
See application file for complete search history.

(56) References Cited

U.S. PATENT DOCUMENTS

| 6,324,545 B1 * | 11/2001 | Morag ............... H04N 1/00132 358/408 |
| 10,049,477 B1 * | 8/2018 | Kokemohr ............. G06T 11/60 |
| 2016/0321831 A1 | 11/2016 | Nakamura et al. |

FOREIGN PATENT DOCUMENTS

| JP | H08-221401 A | 8/1996 |
| JP | 2010-044434 A | 2/2010 |
| JP | 2015-106830 A | 6/2015 |
| JP | 2016-051253 A | 4/2016 |
| WO | 2015/107640 A1 | 7/2015 |

OTHER PUBLICATIONS

D photo print service function; NTT DOCOMO, Inc; online, URL: https://photo-collection.nttdocomo.co.jp/dphoto/service/.
An Office Action; "Notice of Reasons for Refusal," mailed by the Japanese Patent Office on Aug. 3, 2021, which corresponds to Japanese Patent Application No. 2018-184337 and is related to U.S. Appl. No. 16/581,984 with with English translation.

* cited by examiner

*Primary Examiner* — Antoinette T Spinks
(74) *Attorney, Agent, or Firm* — Studebaker & Brackett PC

(57) ABSTRACT

Provided are an image processing apparatus, an image processing method, and an image processing program capable of relatively easily creating text representing a description of an image. From a plurality of images selected from an image group, text describing the plurality of images is generated according to a text generation method. Generated text is displayed in a first text display region and a second text display region. In a case where text is corrected by a user, the text generation method is updated. More accurate text is generated.

15 Claims, 20 Drawing Sheets

FIG. 15
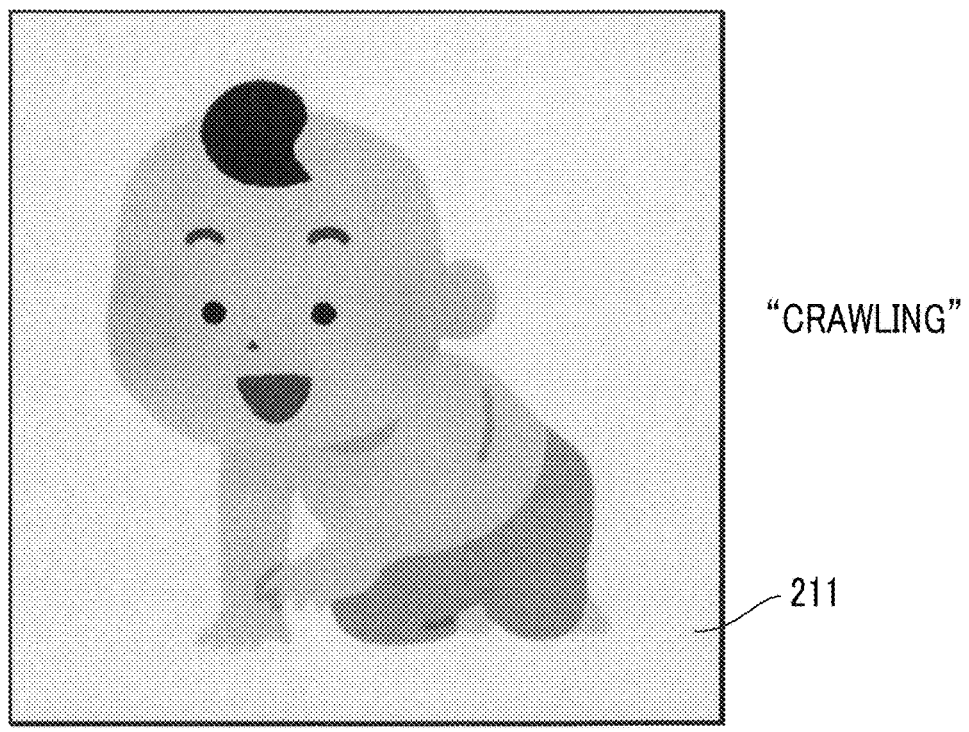
"CRAWLING"
211
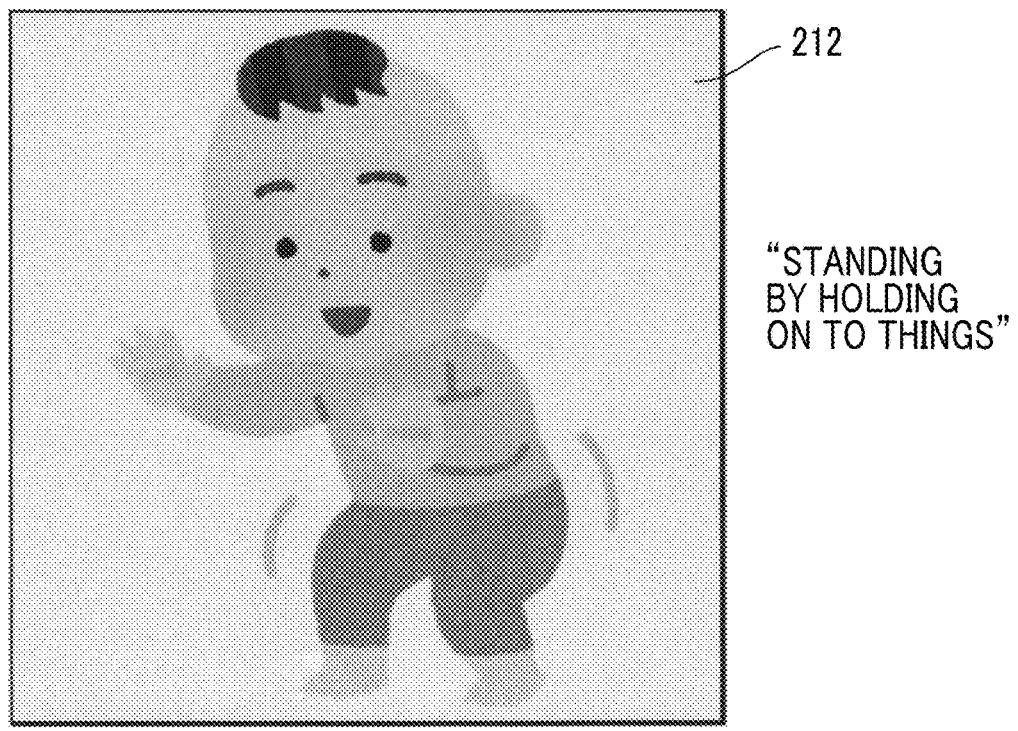
212
"STANDING BY HOLDING ON TO THINGS"

IMAGE PROCESSING APPARATUS, IMAGE PROCESSING METHOD, AND IMAGE PROCESSING PROGRAM

CROSS-REFERENCE TO RELATED APPLICATIONS

The present application claims priority under 35 U.S.C. § 119 to Japanese Patent Application No. 2018-184337, filed Sep. 28, 2018. Each of the above application(s) is hereby expressly incorporated by reference, in its entirety, into the present application.

BACKGROUND OF THE INVENTION

1. Field of the Invention

The present invention relates to an image processing apparatus, an image processing method, and an image processing program.

2. Description of the Related Art

The number of captured images is significantly increased along with wide use of digital cameras and smartphones. In a case where image data representing the captured image is merely stored in the main body of a memory card or a smartphone, the captured image is buried. Therefore, a print service providing photo prints or a photo book constituted by combining the photos, in a case where a designation of a certain number of pieces of photo data is received from a user based on a monthly payment of a certain amount of fee, is performed (https://photo-collection.nttdocomo.co.jp/dphoto/service/). In addition, in a case of managing a document, inputting of a keyword used for a search by a user (JP2016-051253A), matching of an icon image and a document content (JP1996-221401A (JP-H08-221401A)), and the like are considered.

SUMMARY OF THE INVENTION

In a case of creating photo prints or a photobook of a predetermined number of images every month among a lot of images obtained by imaging, merely viewing the printed photo and the photobook is not enough to remember an event, situation or the like in which an image has been captured. Therefore, it is conceivable to input a sentence or the like according to a predetermined number of photo prints and to record the sentence as text together with the photo prints. However, it may be less accurate to automatically generate such text and present the text to the user. In https://photo-collection.nttdocomo.co.jp/dphoto/service/, automatic generation of text itself is not considered. In JP2016-051253A, the keyword is merely input by the user, and such text cannot be generated. In JP1996-221401A (JP-H08-221401A), the icon image and the document content are matched, and after all, it is not conceivable to generate such text.

An object of the present invention is to improve an accuracy of text in a case of giving the text to a plurality of images.

An image processing apparatus according to the present invention comprises: a text notifying device (text notifying means) for providing a notification of text given to a plurality of second images selected from a second image group, the text being generated by a text generating device (text generating means) based on a text generation method, referring to a storage device (storage means) in which a combination of subjects included in each image of a plurality of first images selected from a first image group and information about text given with respect to the plurality of selected first images are stored in relation to each other; a correction accepting device (correction accepting means) for accepting a correction of text notified by the text notifying device; a storage control device (storage control means) for relating a combination of subjects included in each image of the plurality of second images with information about text accepted and corrected by the correction accepting device, and storing the resultant in the storage device; and an updating device (updating means) for updating the text generation method based on the combination of the subjects included in each image of the plurality of second images and the information about the text accepted and corrected by the correction accepting device.

The storage device and the text generating device may be provided in the image processing apparatus itself or in an apparatus other than the image processing apparatus. For example, in a case where the image processing apparatus is realized by a smartphone, a client computer, or the like capable of communicating with an image server or the like, the storage device and the text generating device may be provided in the image server. Further, the updating device also includes a device (means) for transmitting an update command to update the text generation method from the image processing apparatus to an apparatus other than the image processing apparatus such that the text generation method is updated in the apparatus other than the image processing apparatus.

The present invention also provides an image processing method suitable for the image processing apparatus. That is, the image processing method comprises: providing a notification, by a text notifying device (text notifying means), of text given to a plurality of second images selected from a second image group, the text being generated by a text generating device (text generating means) based on a text generation method, referring to a storage device (storage means) in which a combination of subjects included in each image of a plurality of first images selected from a first image group and information about text given with respect to the plurality of selected first images are stored in relation to each other; accepting, by a correction accepting device (correction accepting means), a correction of text notified by the text notifying device; relating, by a storage control device (storage control means), a combination of subjects included in each image of the plurality of second images with information about text accepted and corrected by the correction accepting device, and storing the resultant in the storage device; and updating, by a updating device (updating means), the text generation method based on the combination of the subjects included in each image of the plurality of second images and the information about the text accepted and corrected by the correction accepting device.

The image processing apparatus according to the present invention comprises a processor, the processor may perform: providing a notification of text given to a plurality of second images selected from a second image group, the text being generated by a text generating device (text generating means) based on a text generation method, referring to a storage device (storage means) in which a combination of subjects included in each image of a plurality of first images selected from a first image group and information about text given with respect to the plurality of selected first images are stored in relation to each other; accepting a correction of text which is notified; relating the combination of the subjects included in each image of the plurality of second images with information about text accepted and corrected, and storing the resultant in the storage device; and updating the text generation method based on the combination of the subjects included in each image of the plurality of second images and the information about the text accepted and corrected.

The present invention also provides a program for controlling a computer of the image processing apparatus and a recording medium storing the program.

For example, in a case where the plurality of second images include an image including a subject represented by a word which appears at a frequency equal to or higher than a threshold, among words included in the information about the text stored in the storage device, the text generating device generates text to be given to the plurality of second images based on the word which appears at the frequency equal to or higher than the threshold.

The image processing apparatus may further comprise an image notifying device (image notifying means) for, in a case where a third image group includes an image including a subject represented by a word which appears at a frequency equal to or higher than a threshold, among words included in the information about the text stored in the storage device, providing a notification of the image including the subject as an image to be selected from the third image group.

For example, in a case where the plurality of second images include the same subject as the subject included in the plurality of first images and the same subject changes, the text generating device may generate text representing a state of a change of the same subject.

For example, the text generating device may generate text to be given to the plurality of second images based on information about text related to a first subject and a second subject included in different images among the plurality of second images.

For example, the text generating device may generate text to be given to the plurality of second images based on information about text related to a subject commonly included in a plurality of images among the plurality of second images.

The image processing apparatus may further comprise an image product creating device (image product creating means) for arranging at least one of the plurality of images at a center and creating an image product for the plurality of second images.

For example the text generating device may generate text to be given to a plurality of third images recommended as an image to be selected from a third image group with selection criterion based on the first image and the second image.

Imaging times of the plurality of first images may be different from imaging times of the plurality of second images.

The image processing apparatus may further comprise an image product creating device (image product creating means) for creating image products for the plurality of first images and the plurality of second images.

The image processing apparatus may further comprise the text generating device.

The image processing apparatus may further comprise a reception device (reception means) for receiving data representing text generated by the text generating device. In this case, for example, the text notifying device provides a notification of text represented by the data received by the reception device.

According to the present invention, in a case where notified text is corrected, the method of generating the text to be given to the plurality of second images selected from the second image group is updated, and consequently more appropriate text is capable of being notified to a user.

BRIEF DESCRIPTION OF THE DRAWINGS

FIG. 15 is an example of an image.

DESCRIPTION OF THE PREFERRED EMBODIMENTS

Main Example

Figure 1:
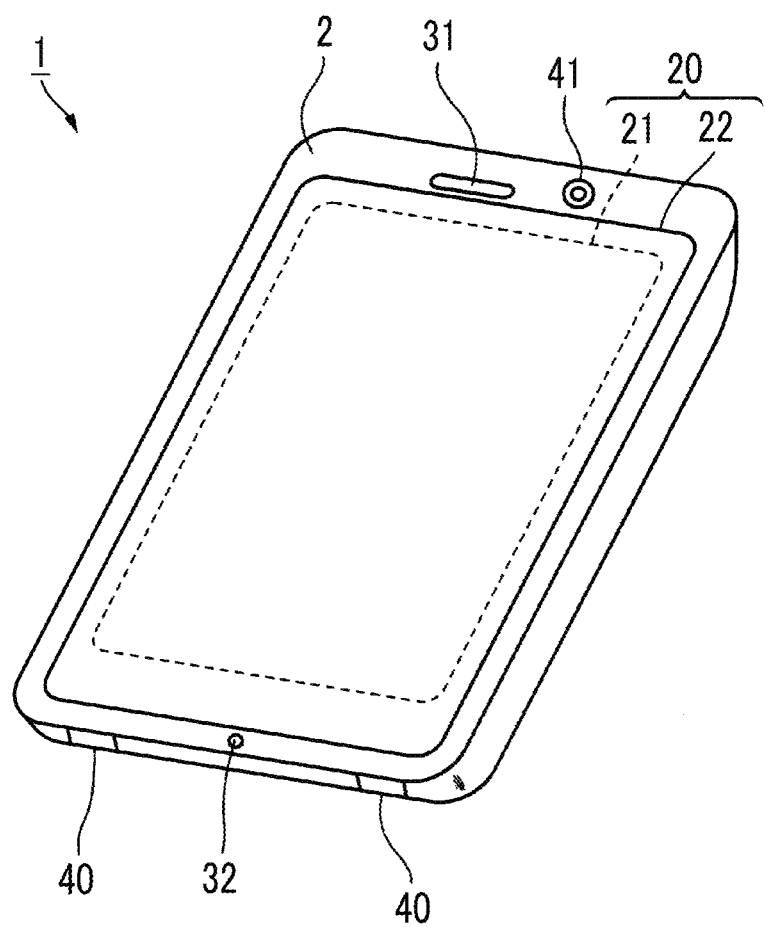
FIG. 1 illustrates an appearance of a smartphone.

FIG. 1 illustrates an appearance of a smartphone 1 which is an embodiment of an image processing apparatus of the present invention. The smartphone 1 illustrated in FIG. 1 includes a casing 2 having a flat plate shape and comprises a display and input unit 20 in which a display panel 21 as a display unit and an operation panel 22 as an input unit are formed as a single unit on one surface of the casing 2. In addition, the casing 2 comprises a microphone 32, a speaker 31, an operation unit 40, and a camera unit 41. A configuration of the casing 2 is not limited to this, and for example, a configuration in which a display unit and an input unit are independent may be adopted, or a configuration having a folding structure or a slide mechanism may be adopted.

Figure 2:
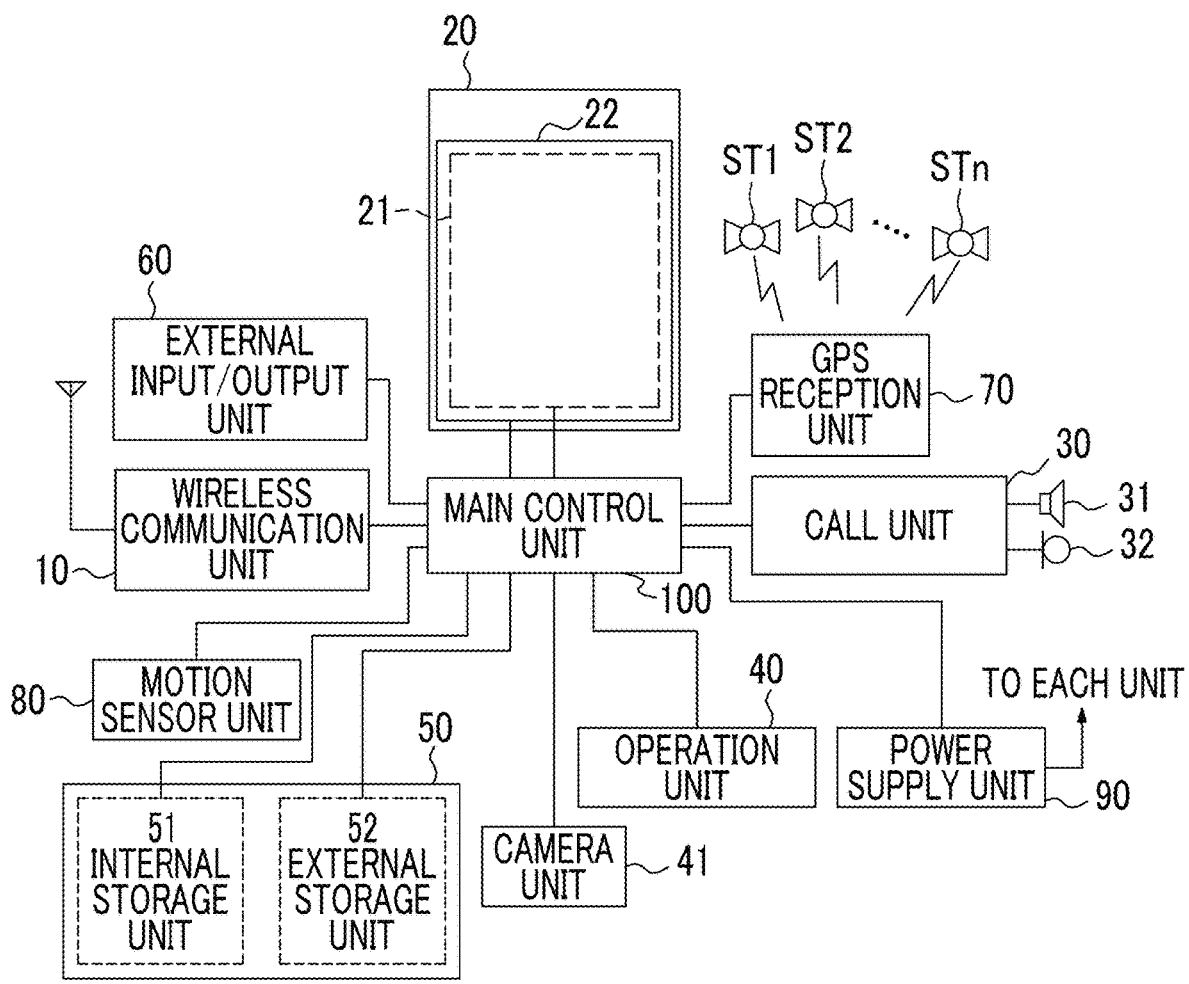
FIG. 2 is a block diagram illustrating an electric configuration of the smartphone.

FIG. 2 is a block diagram illustrating a configuration of the smartphone 1 illustrated in FIG. 1. As illustrated in FIG. 2, main constituents of the smartphone comprise a wireless communication unit 10, the display and input unit 20, a call unit 30, the operation unit 40, the camera unit 41, a storage unit 50, an external input/output unit 60, a global positioning system (GPS) reception unit 70, a motion sensor unit 80, a power supply unit 90, and a main control unit 100. In addition, main functions of the smartphone 1 have a wireless communication function of performing mobile wireless communication with a base station apparatus BS through a mobile communication network NW.

The wireless communication unit 10 performs wireless communication with the base station apparatus BS accommodated in the mobile communication network NW in accordance with an instruction from the main control unit 100. By using the wireless communication, transmission and reception of various file data such as voice data and image data, electronic mail data, and the like and reception of web data, streaming data, and the like are performed.

The display and input unit 20 is a so-called touch panel that visually delivers information to a user by displaying images (still images and motion images), text information, and the like and detects a user operation performed on the displayed information under a control of the main control unit 100, and comprises a display panel 21 and an operation panel 22.

The display panel 21 uses a liquid crystal display (LCD), an organic electro-luminescence display (OELD) or the like as a display device. The operation panel 22 is a device that is mounted in a manner enabling visual recognition of an image displayed on a display surface of the display panel 21 and detects one or a plurality of coordinates operated by a finger of the user or a stylus. In a case where the device is operated by the finger of the user or the stylus, a detection signal generated by the operation is output to the main control unit 100. Next, the main control unit 100 detects an operation position (coordinates) on the display panel 21 based on the received detection signal.

As illustrated in FIG. 1, although the display panel 21 and the operation panel 22 of the smartphone 1 illustrated as one embodiment of the image processing apparatus according to the present invention constitute the display and input unit 20 as a single unit, the operation panel 22 is arranged to completely cover the display panel 21. In a case of employing such an arrangement, the operation panel 22 may have a function of detecting the user operation even in a region outside the display panel 21. In other words, the operation panel 22 may comprise a detection region (hereinafter, referred to as a display region) for an overlapping part overlapping the display panel 21 and a detection region (hereinafter, referred to as a non-display region) for the other peripheral part not overlapping the display panel 21.

The size of the display region may completely match the size of the display panel 21, but both sizes do not necessarily match. In addition, the operation panel 22 may comprise two sensitive regions including the peripheral part and the other inner part. Furthermore, the width of the peripheral part is appropriately designed depending on the size and the like of the casing 2. Furthermore, a position detection method employed on the operation panel 22 is exemplified by a matrix switch method, a resistive film method, a surface acoustic wave method, an infrared method, an electromagnetic induction method, an electrostatic capacitive method, and the like, and either method is capable of being adopted.

The call unit 30 comprises the speaker 31 and the microphone 32, converts user's voice input through the microphone 32 into voice data which can be processed by the main control unit 100 and outputs the voice data to the main control unit 100, and decodes voice data received by the wireless communication unit 10 or the external input/output unit 60 and outputs the decoded voice data from the speaker 31. In addition, as illustrated in FIG. 1, for example, the speaker 31 can be mounted on the same surface as the surface on which the display and input unit 20 is disposed, and the microphone 32 can be mounted on a side surface of the casing 2.

The operation unit 40 is a hardware key using a key switch or the like, and receives an instruction from the user. For example, as illustrated in FIG. 1, the operation unit 40 is a push button type switch that is mounted on a side of the casing 2 of the smartphone 1, and turned on in a case of being pressed by a finger or the like, and turned off by a restoring force such as a spring in a case where the finger is released.

The storage unit 50 stores a control program and control data of the main control unit 100, application software, address data in which a name, a telephone number, and the like of a communication counterpart are associated, data of transmitted and received electronic mails, web data downloaded by web browsing, and downloaded contents data and also temporarily stores streaming data and the like. In addition, the storage unit 50 is configured with an internal storage unit 51 incorporated in the smartphone and an external storage unit 52 including a slot for an attachable and detachable external memory. Each of the internal storage unit 51 and the external storage unit 52 constituting the storage unit 50 is realized using a storage medium such as a memory of a flash memory type, a hard disk type, a multimedia card micro type, or a card type (for example, a MicroSD (registered trademark) memory), a random access memory (RAM), or a read only memory (ROM).

The external input/output unit 60 acts as an interface for all external apparatuses connected to the smartphone 1 and is directly or indirectly connected to other external apparatuses by communication and the like (for example, Universal Serial Bus (USB) and IEEE 1394) or networks (for example, the Internet, a wireless LAN, Bluetooth (registered trademark), radio frequency identification (RFID), Infrared Data Association (IrDA) (registered trademark), Ultra Wideband (UWB) (registered trademark), and ZigBee (registered trademark)).

For example, the external apparatuses connected to the smartphone 1 include a wired/wireless headset, a wired/wireless external charger, a wired/wireless data port, a memory card or a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, a PDA connected in a wired/wireless manner, and an earphone connected in a wired/wireless manner, or the like. The external input/output unit can deliver data transferred from the external apparatuses to each constituent inside the smartphone 1 or transfer data inside the smartphone 1 to the external apparatuses.

The GPS reception unit 70 receives GPS signals transmitted from GPS satellites ST1 to STn, executes position measurement calculation processing based on the plurality of received GPS signals, and obtains a position including the latitude, the longitude, and the altitude of the smartphone 1 in accordance with an instruction from the main control unit 100. When positional information can be obtained from the wireless communication unit 10 or the external input/output unit 60 (for example, a wireless LAN), the GPS reception unit 70 can detect the position using the positional information.

The motion sensor unit 80 comprises, for example, a three-axis acceleration sensor and detects a physical motion of the smartphone 1 in accordance with an instruction from the main control unit 100. By detecting the physical motion of the smartphone 1, the movement direction and the acceleration of the smartphone 1 are detected. The detection result is output to the main control unit 100.

The power supply unit 90 supplies power stored in a battery (not illustrated) to each unit of the smartphone 1 in accordance with an instruction from the main control unit 100.

The main control unit 100 comprises a microprocessor, operates in accordance with the control program and the control data stored in the storage unit 50, and manages and controls each unit of the smartphone 1. In addition, the main control unit 100 has a mobile communication control function of controlling each unit of a communication system and an application processing function in order to perform voice communication and data communication through the wireless communication unit 10.

The application processing function is realized by operating the main control unit 100 in accordance with the application software stored in the storage unit 50. For example, the application processing function includes an infrared communication function of performing data communication with an opposing device by controlling the external input/output unit 60, an electronic mail function of transmitting and receiving electronic mails, and a web browsing function of browsing a web page.

In addition, the main control unit 100 comprises an image processing function such as displaying a video on the display and input unit 20 based on image data (data of a still image or a motion image) such as reception data and downloaded streaming data. The image processing function is a function of causing the main control unit 100 to decode the image data, perform image processing on the decoding result, and display the image on the display and input unit 20.

Furthermore, the main control unit 100 executes display control of the display panel 21 and operation detection control of detecting the user operation performed through the operation unit 40 or the operation panel 22. By executing the display control, the main control unit 100 displays an icon for starting the application software or a software key such as a scroll bar, or displays a window for composing an electronic mail. The scroll bar refers to a software key for receiving an instruction to move a display part of an image for a large image or the like not accommodated in the display region of the display panel 21.

In addition, by executing the operation detection control, the main control unit 100 detects the user operation performed through the operation unit 40, receives an operation performed on the icon through the operation panel 22 or an input of a text string in an input field of the window, or receives a request for scrolling the display image through the scroll bar.

Furthermore, the main control unit 100 has a touch panel control function of determining whether the operation position on the operation panel 22 is in the overlapping part (display region) overlapping the display panel 21 or the other peripheral part (non-display region) not overlapping the display panel 21 and controlling the sensitive region of the operation panel 22 and the display position of the software key by executing the operation detection control.

In addition, the main control unit 100 can detect a gesture operation performed on the operation panel 22 and execute a predetermined function depending on the detected gesture operation. The gesture operation is not a simple touch operation in the related art and means an operation of drawing a trajectory by the finger or the like or designating a plurality of positions at the same time, or operation of a combination thereof by drawing a trajectory from at least one of the plurality of positions.

The camera unit 41 is a digital camera performing electronic imaging using an imaging element such as a complementary metal oxide semiconductor (CMOS) or a charge-coupled device (CCD). In addition, the camera unit 41 converts the image data obtained by imaging into compressed image data in, for example, Joint Photographic Experts Group (JPEG) and records the image data in the storage unit 50 or outputs the image data through the external input/output unit 60 or the wireless communication unit 10 under the control of the main control unit 100. In the smartphone 1 as illustrated in FIG. 1, the camera unit 41 is mounted on the same surface as the display and input unit 20, however, the mounting position of the camera unit 41 is not limited to this, and the camera unit 41 may be mounted on a rear surface of the display and input unit 20, or a plurality of camera units 41 may be mounted. In a case where the plurality of camera units 41 are mounted, imaging may be performed by a single camera unit 41 by switching the camera unit 41 performing the imaging, or imaging may be performed using the plurality of camera units 41 at the same time.

In addition, the camera unit 41 can be used in various functions of the smartphone 1. For example, the image obtained by the camera unit 41 can be displayed on the display panel 21, or the image of the camera unit 41 can be used as an operation input of the operation panel 22. In addition, in the detection of the position by the GPS reception unit 70, the position can be detected with reference to the image from the camera unit 41. Furthermore, with reference to the image from the camera unit 41, a determination of the optical axis direction of the camera unit 41 of the smartphone 1 and a determination of the current usage environment can be performed without using the three-axis acceleration sensor or along with the three-axis acceleration sensor. Of course, the image from the camera unit 41 can also be used in the application software.

Besides, the image data of the still picture or the motion picture can be recorded in the storage unit 50 or output through the external input/output unit 60 or the wireless communication unit 10 by adding the positional information obtained by the GPS reception unit 70, voice information (may be text information obtained by performing voice-to-text conversion by the main control unit or the like) obtained by the microphone 32, posture information obtained by the motion sensor unit 80, and the like to the image data.

Figure 3:
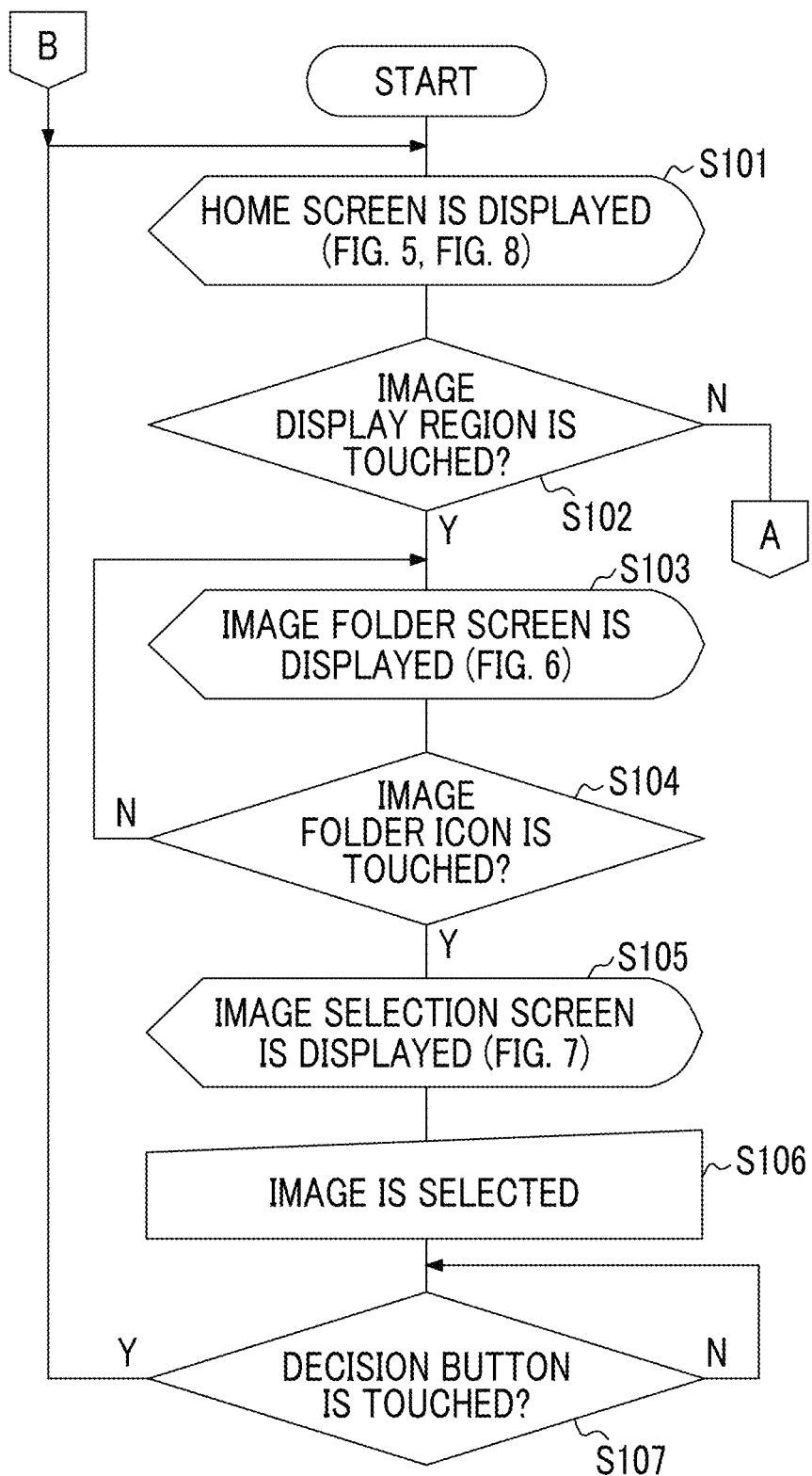
FIG. 3 is a flowchart illustrating a processing procedure of the smartphone.
Figure 4:
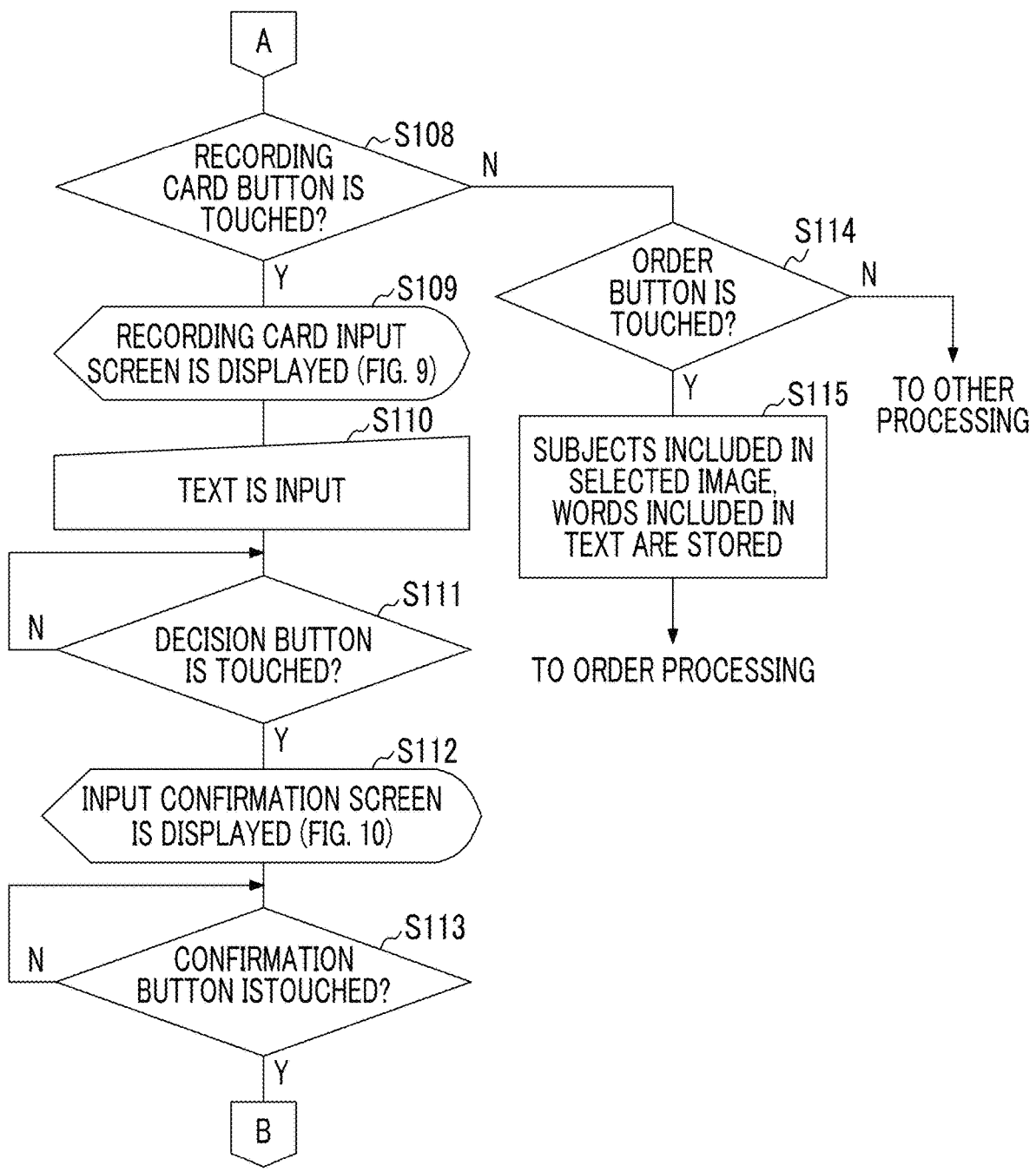
FIG. 4 is a flowchart illustrating a processing procedure of the smartphone.

FIG. 3 and FIG. 4 are flowcharts illustrating processing procedures of the smartphone 1. A program obtained through an Internet or the like is installed in advance in the smartphone 1, and the processing illustrated in FIG. 3 and FIG. 4 starts by starting the program. In addition, the program may be stored in a recording medium such as the external storage unit 52, and the program read from the external storage unit 52 may be installed on the smartphone 1. The program selects an image to be printed from images captured in a certain month, and assists text input by a user by automatically creating text representing an imaging status of the selected image and notifying the user of the text. In particular, a creation method (sentence creation method) for creating text is updated in order to improve the accuracy of the text to be notified to the user.

In this Example, 11 sheets of images (or may not 11 sheets) are selected out of a large number of images every month, and text representing status of the selected image or the like is input. The selected image is printed and the input text is printed as a recording card, and these prints are mailed to the user.

Figure 5:
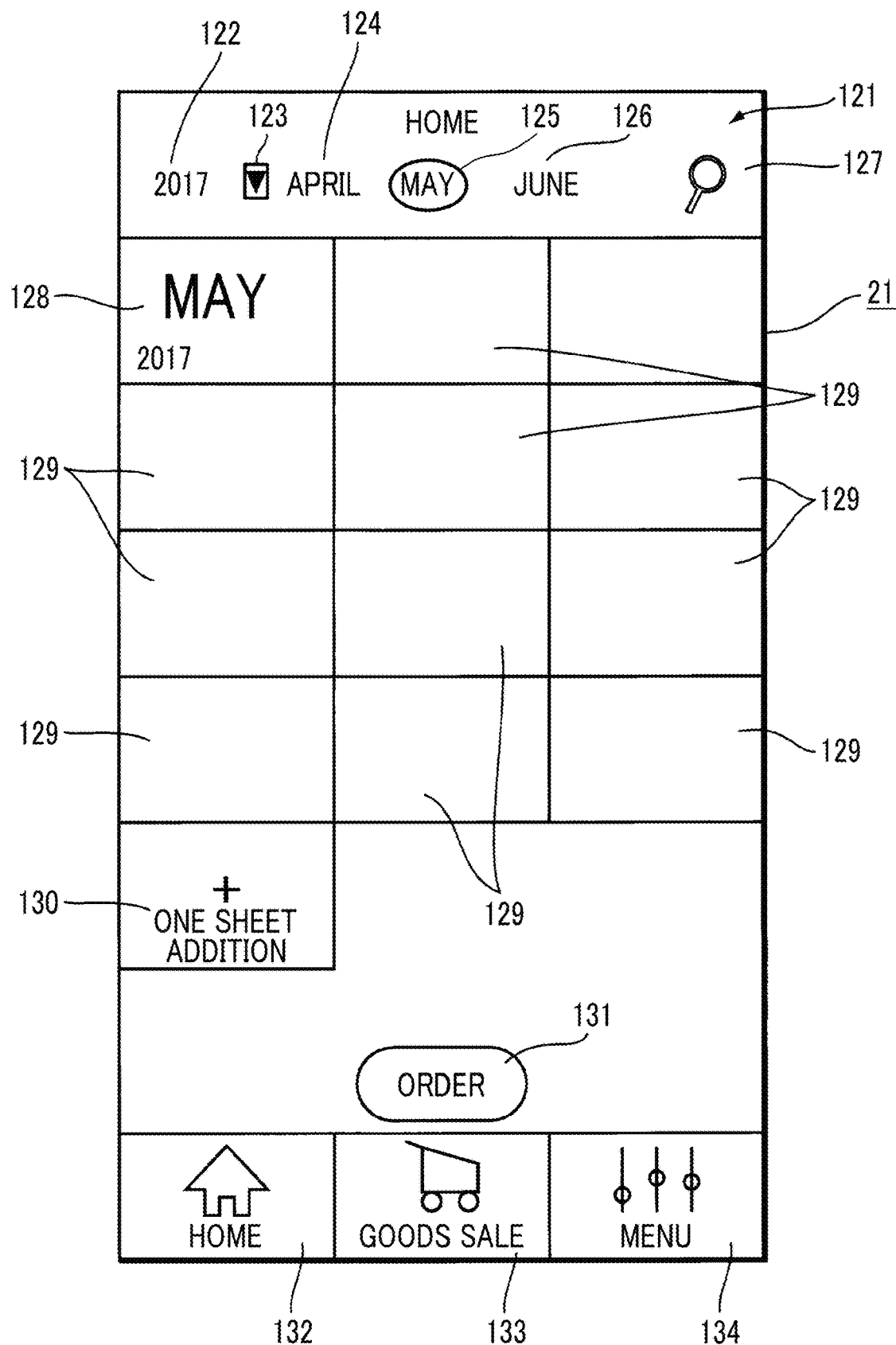
FIG. 5 is an example of a home screen.

In a case where the program starts, a home screen illustrated in FIG. 5 is displayed on the display panel 21 of the smartphone 1 (step S101)

Eleven image display regions 129 are formed almost throughout the home screen (the number of image display regions 129 may be less than 11 or greater than or equal to 12). An imaging year and month display region 128 is displayed in almost the upper left portion of the home screen. The imaging year and month display region 128 displays a text string "May" and a text string "2017". The imaging year and month display region 128 of the home screen after the start of the program displays the year and month corresponding to the time of the start of the program. In the home screen illustrated in FIG. 5, the program is started in May 2017.

An imaging year and month designating region 121 is formed in the upper portion of the home screen. An imaging year display region 122 and a pull-down button 123 are formed in the imaging year and month designating region 121. By pulling down the pull-down button 123, a pull-down menu is shown, and the user can select a desired imaging year. Imaging month designating regions 124, 125, and 126 are formed on the right side of the imaging year display region 122. By scrolling the imaging year and month designating region 121 to the left and the right, months displayed in the imaging month designating regions 124, 125, and 126 are switched. In the home screen illustrated in FIG. 5, the imaging month designating regions 124, 125, and 126 display "April", "May", and "June", respectively, and a text string "May" displayed in the imaging month designating region 125 at the center is circled. By circling "May", it is shown that "May" is selected as a month in which an image displayed in the image display region 129 is captured. A search button 127 is formed on the right side of the imaging month designating region 125. An image addition region 130 is formed on the lower left side of the image display region 129. By touching the image addition region 130, the number of image display regions 129 displayed on the home screen is increased by one.

An order button 131 on which a text string "order" is displayed is displayed in the lower portion of the home screen. The order button 131 is touched in a case of ordering a print of the image. In addition, a home button 132 on which a text string "home" is displayed, a goods sale button 133 on which a text string "goods sale" is displayed, and a menu button 134 on which a text string "menu" is displayed are formed in the lowermost portion of the home screen.

In a state where an image is not selected, an image is not displayed in the image display region 129. In a state where an image is not displayed, in a case where any image display region 129 of the 11 image display regions 129 is touched (YES in step S102), the display panel 21 displays an image folder screen illustrated in FIG. 6 (step S103).

Figure 6:
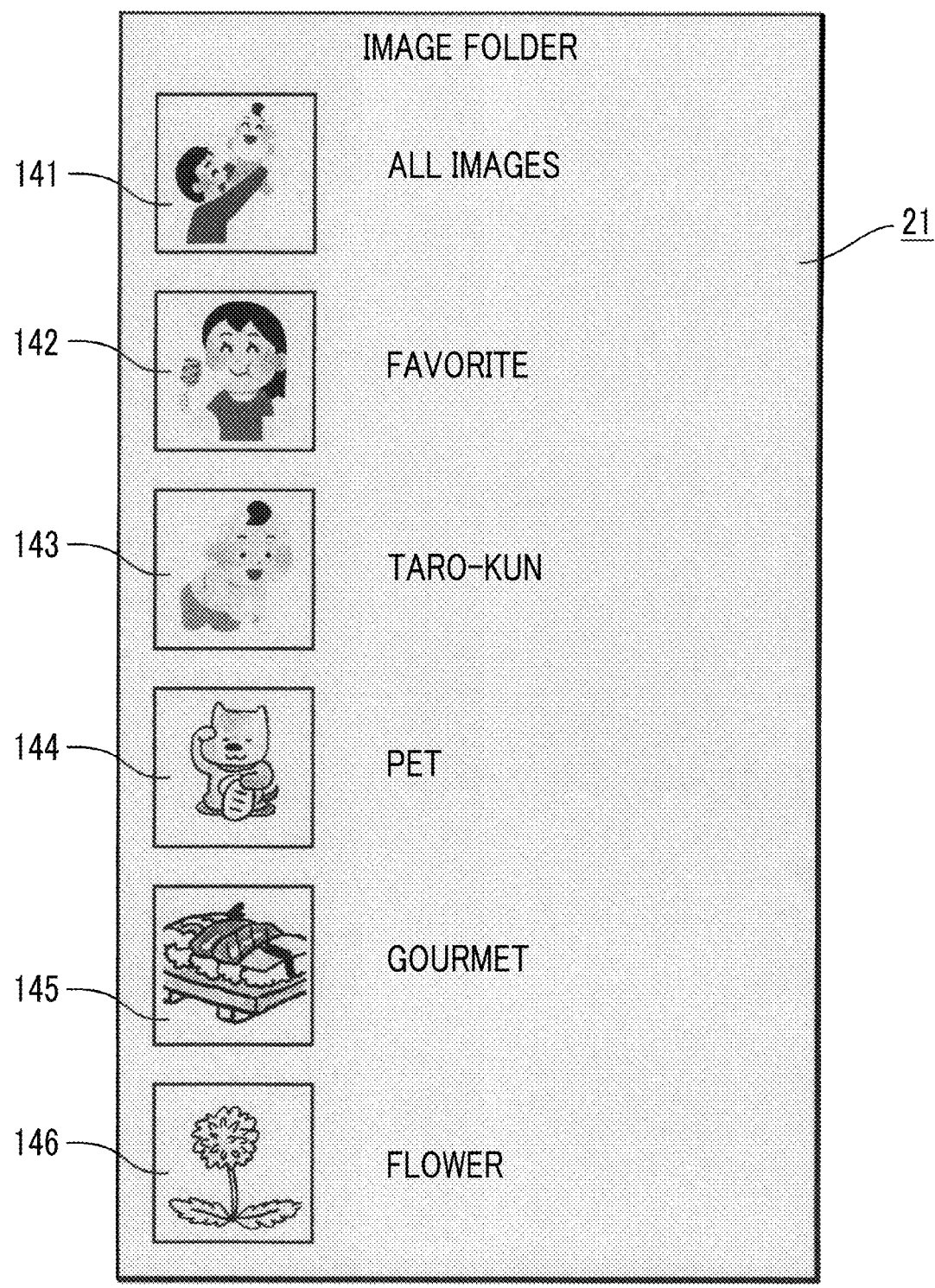
FIG. 6 is an example of an image folder screen.

FIG. 6 is an example of the image folder screen displayed on the display panel 21.

The image folder screen displays image folder icons 141 to 146, and a folder name is displayed on the right side of each of the image folder icons 141 to 146. The image folder icon 141 represents an image folder storing all images captured in a certain month (in the example illustrated in FIG. 6, May 2017). The other image folder icons 142 to 146 represent icons of image folders generated by the user among the images captured in the month. In a case where an image folder icon other than the image folder icons 141 to 146 displayed on the display panel 21 is present, the image folder icon not displayed on the display panel 21 is displayed on the display panel 21 by scrolling the surface of the display panel 21. In this Example, it is assumed that only the image folder icons 141 to 146 are generated. In a case where any image folder icon of the image folder icons 141 to 146 is touched (YES in step S104), an image selection screen is displayed on the display panel 21 (step S105). An image stored in the image folder specified by the touched image folder icon is displayed on the display panel 21.

Figure 7:
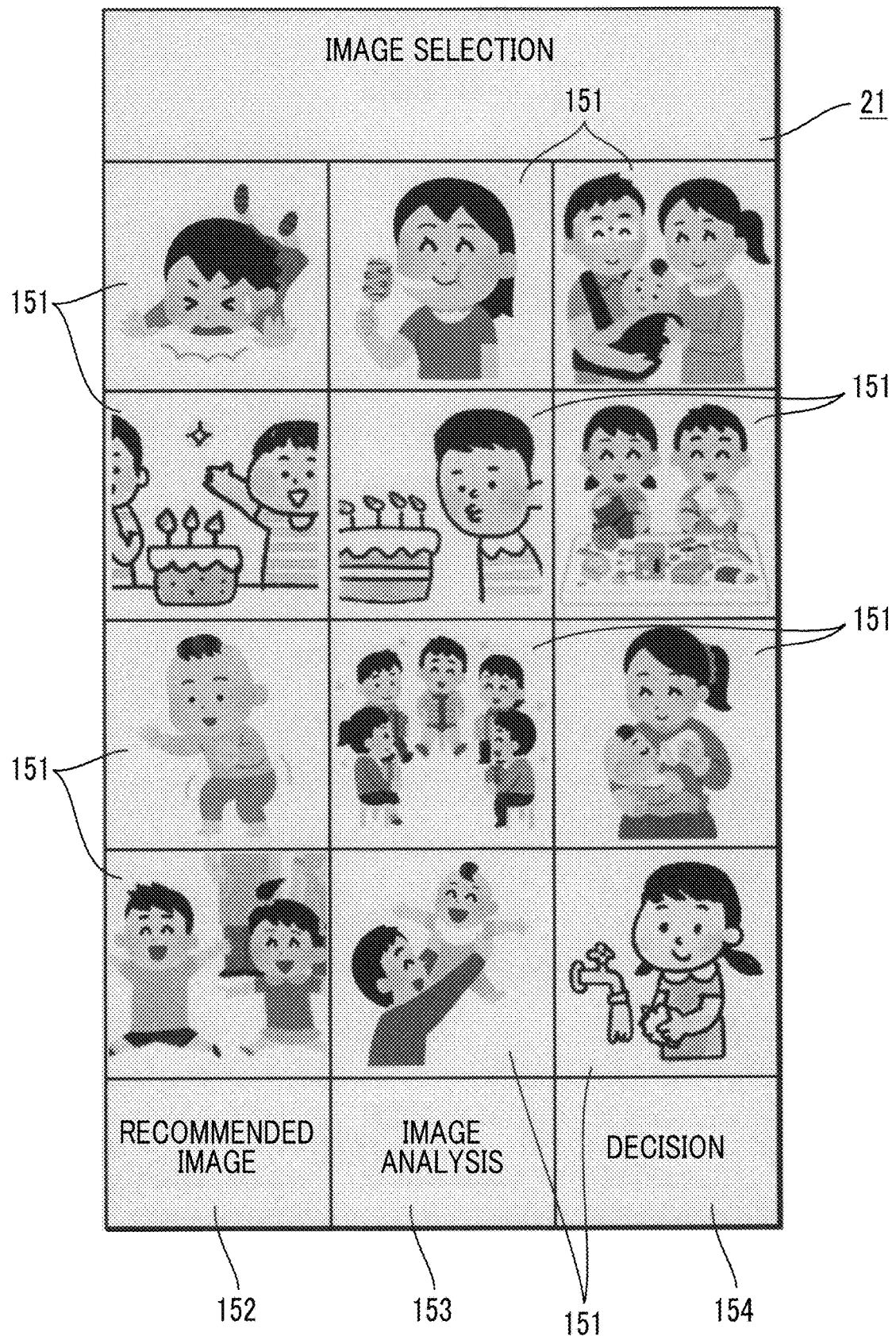
FIG. 7 is an example of an image selection screen.

FIG. 7 is an example of an image selection screen for displaying a list of images stored in the image folder specified by the touched image folder icon.

The image selection screen displays multiple image display regions 151, and images are displayed in the image display regions 151. In a case where an image not displayed on the display panel 21 is present, the image not displayed on the display panel 21 is displayed on the display panel 21 by scrolling the screen of the display panel 21.

A recommended image button 152 on which a text string "recommended image" is displayed, an image analysis button 153 on which a text string "image analysis" is displayed, and a decision button 154 on which a text string "decision" is displayed are formed in the lower portion of the image selection screen. The recommended image button 152 is touched in a case of notifying the user of information related to the image recommended as the image to be selected by the user based on a tendency of previously selected images. The image analysis button 153 is touched in a case of notifying the user of an image determined as having a good quality by analyzing the image. The decision button 154 is touched in a case of deciding the image to be printed.

The user touches the image displayed in the image display region 151 to select an image (step S106), and touches the decision button 154 (YES in step S107) to decide 11 sheets (or may not be 11 sheets) of images to be printed.

Figure 8:
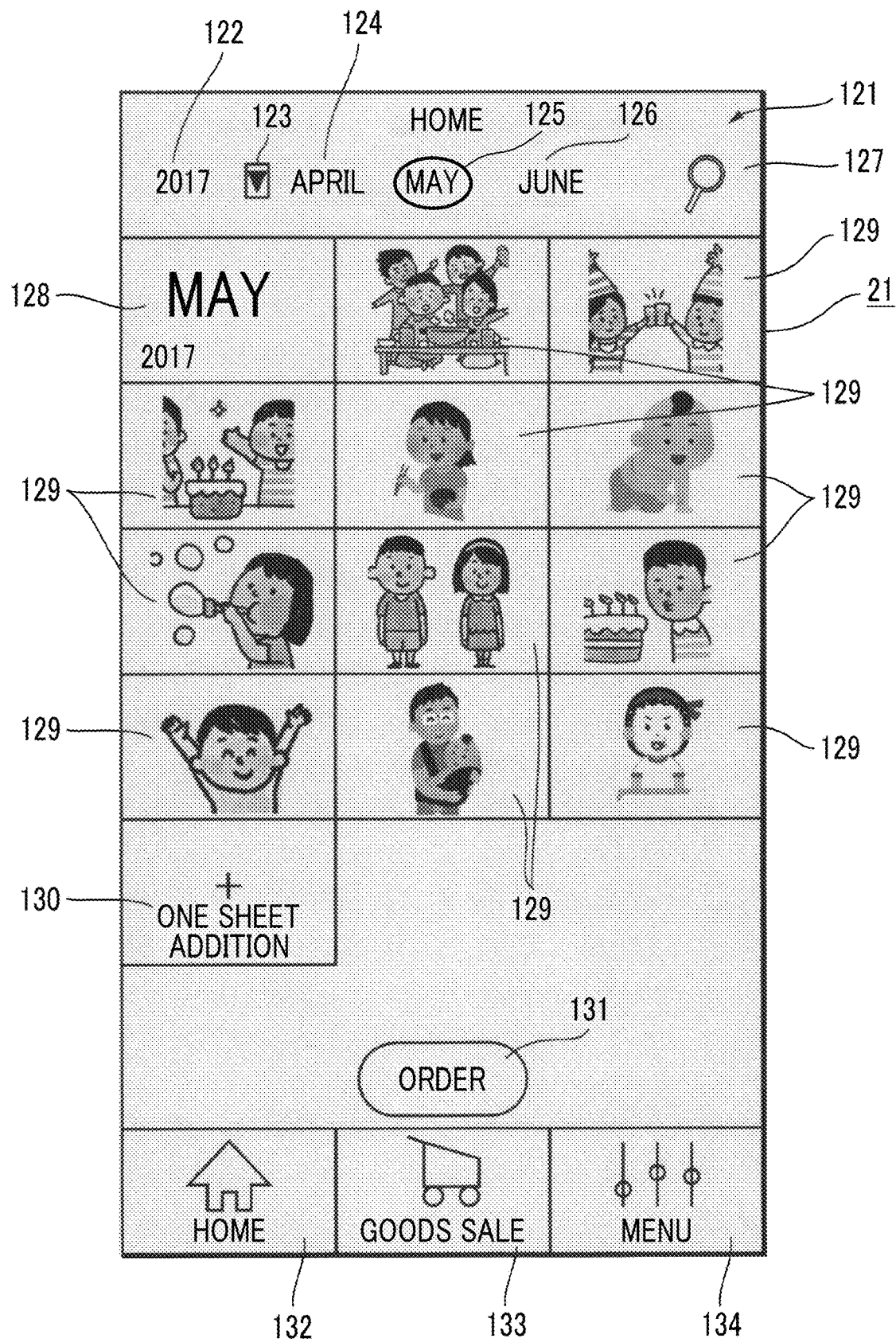
FIG. 8 is an example of a home screen.

In a case where the decision button 154 is touched, the selected image is displayed in the image display region 151 of the home screen as illustrated in FIG. 8.

In this Example, text about a status of the selected image or the like can be input as a description. As described above, the input text is printed as a recording card and mailed to the user along with the prints of the selected image. In a case where the image display region 129 is not touched while the home screen is displayed (NO in step S102) and the menu button 134 is touched, a menu appears, and a recording card button appears from the menu. In a case where the recording card button is touched (YES in step S108 in FIG. 4), a recording card input screen is displayed on the display panel 21 (step S109).

Figure 9:
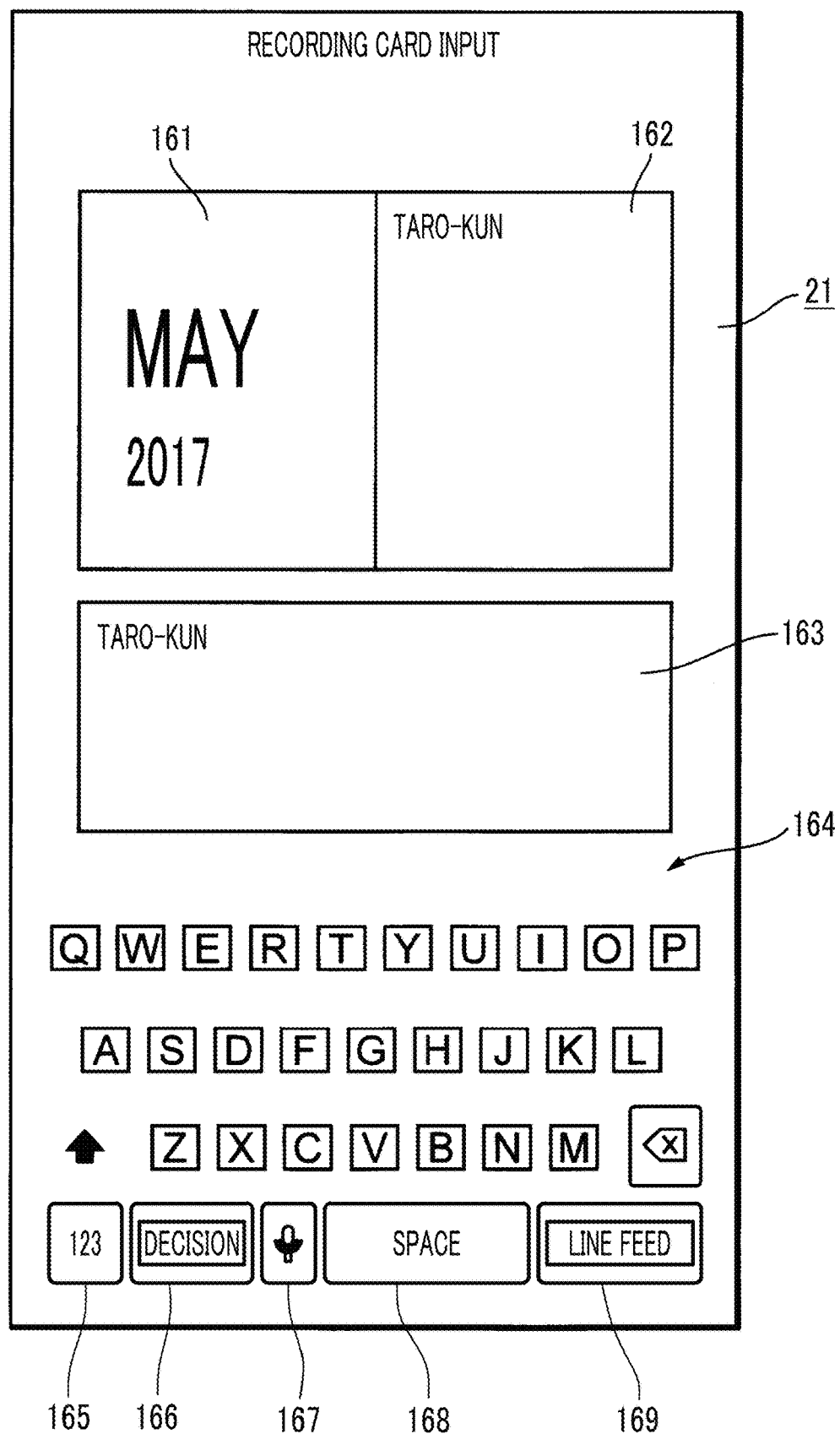
FIG. 9 is an example of a recording card input screen.

FIG. 9 is an example of a recording card input screen.

In the recording card input screen, an imaging year and month display region 161 for displaying when the image recording card is about, a first text display region 162 and a second text display region 163 for displaying the input text, and a keypad display region 164 for inputting text are displayed. The first text display region 162 notifies the user of the image when the text is actually printed, and the second text display region 163 displays the text input from the keypad (note that a single text display may be both a keypad input display and a print image display). Any one of the first text display region 162 or the second text display region 163 may be displayed. In the keypad display region 164, in addition to an alphabetic keypad, a switching button 165 to be touched when displaying a numeric keypad, a decision button 166 to be touched when deciding an input text, a microphone button 167 to be touched when turning on a voice input, a space button 168 to be touched when entering a space, and a line feed button 169 to be touched when entering a line feed, and the like are formed. In a case where the alphabetic keypad is displayed in the keypad display region 164 and the switching button 165 is touched, a numeric keypad is displayed in the keypad display region 164, and in a case where the numeric keypad is displayed in the keypad display region 164 and the switching button 165 is touched, the alphabetic keypad is displayed in the keypad display region 164. In a case where text is input using a keypad formed in the keypad display region 164 (step S110), the input text is displayed in the first text display region 162 and the second text display region 163.

In a case where the input of the text is completed and the decision button 166 is touched (YES in step S111), an input confirmation screen is displayed on the display panel 21 (step S112).

Figure 10:
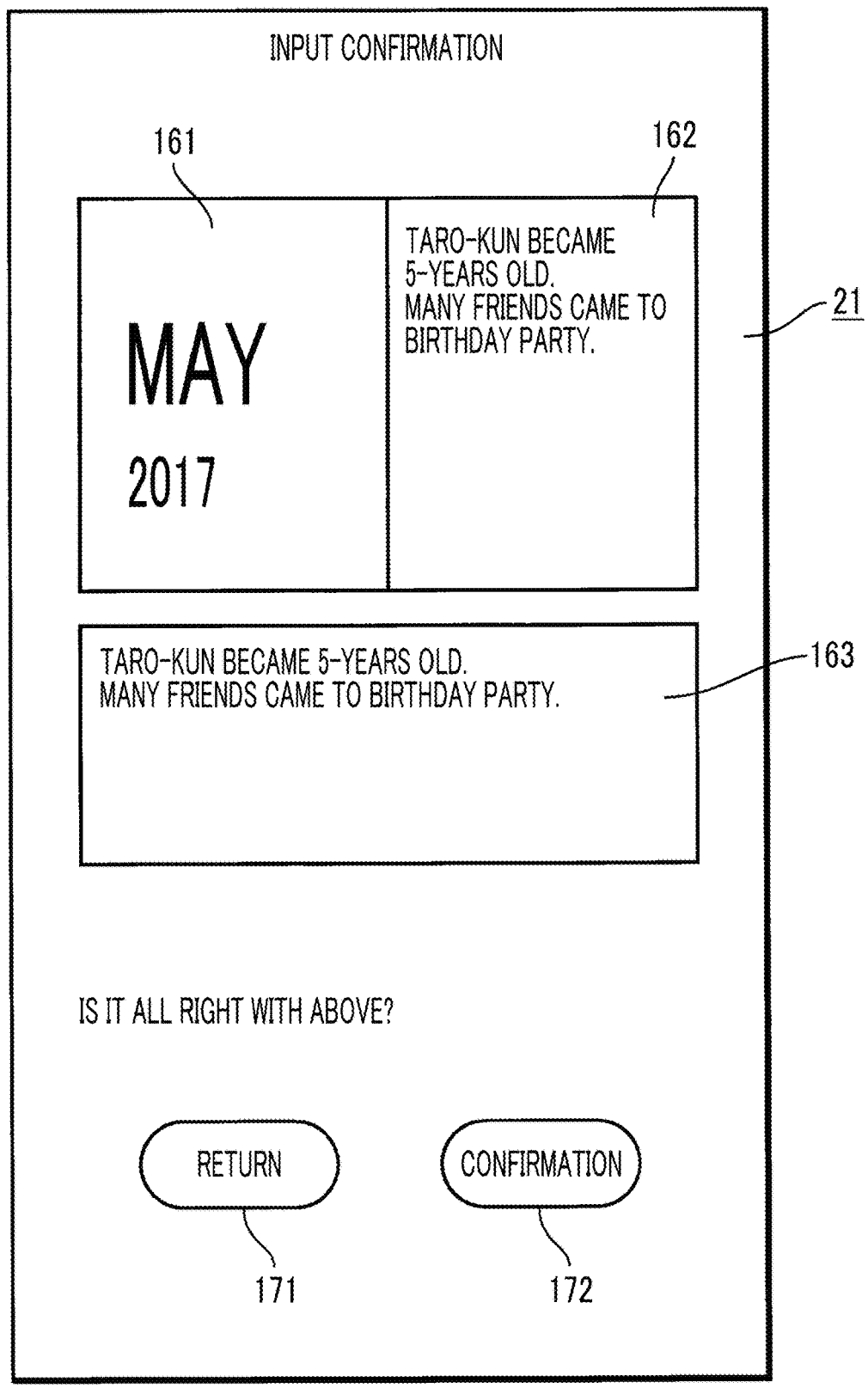
FIG. 10 is an example of an input confirmation screen.

FIG. 10 is an example of an input confirmation screen.

In the input confirmation screen, in addition to the imaging year and month display region 161, the first text display region 162 and the second text display region 163 for displaying the input text, a return button 171 in which a text string of "return" is formed and a confirmation button 172 in which a text string of "confirmation" is formed, are formed. The input text is displayed in the first text display region 162 and the second text display region 163. In a case where the text is corrected, the return button 171 is touched. Then, the screen is switched to the recording card input screen illustrated in FIG. 9, and the text is corrected. In a case where the displayed text is acceptable, the confirmation button 172 is touched (YES in step S113). Then, the home screen illustrated in FIG. 8 is displayed on the display panel 21. In FIG. 10, the sentence "Taro-kun became 5-years old. Many friends came to the birthday party." is input as the text of an image selected from the images captured in May 2017.

In a case where the order button is touched in a state where the home screen is displayed on the display panel 21 (YES in step S114, FIG. 4), a subject (which is a main subject) included in the image is extracted, and a word included in the input text is extracted, from the selected image. The extracted subjects and words are stored in the internal storage unit 51 (which is an example of a storage device) in a form of a table (step S115).

Table 1 is an example of a subject-word table storing the extracted subjects and words.

TABLE 1

| Imaging year and month | Subject | Word |
|---|---|---|
| May 2017 | Boy, girl, hat, cup, cake, candle | Taro-kan, 5-years old, birthday party, friends |

The subject-word table stores the subject and the word included in the selected image in association with the imaging year and month of the selected image. An item of the subject included in the subject-word table corresponds to a combination of subjects included in respective images of the plurality of first images selected from the first image group, and an item of the word included in the subject-word table corresponds to information about the given text for the selected plurality of first images. In Table 1, a text string such as "boy" is stored corresponding to the subject, but it is preferable to store image data representing an image represented by the subject. However, a sentence may be stored. The input text itself rather than the words extracted from the input text may be stored in the subject-word table.

As illustrated in FIG. 8, since "boy", "girl", "hat", "cup", "cake", and "candle" are included in the images (which is an example of a plurality of images selected from the first image group) selected among the images (which is an example of the first image group) captured in May 2017, the "boy", "girl" "hat", "cup", "cake", and "candle" (which is an example of a combination of subjects included in each image of the first images) representing those subjects are stored in the subject-word table. Also, since the sentence "Taro-kun became 5-years old. Many friends came to the birthday party." is input as a text of the selected image among the images captured in May 2017, words such as "Taro-kun", "5-years old", "birthday party", and "friends" (which is an example of information on the text given to the first image) are stored in the subject-word table from the sentence.

Thereafter, processing proceeds to order processing, printing of the selected image and printing of the recording card on which the input text is recorded are performed, and the prints are mailed to the user.

In a case where the above processing is repeated, in the subject-word table as illustrated in Table 2, combinations of the subject extracted from the selected image and the words extracted from the input text are accumulated corresponding to the imaging year and month.

TABLE 2

| Imaging year and month | Subject | Word |
|---|---|---|
| May 2017 | Boy, girl, hat, cup, cake, candle | Taro-kun, 5-years old, birthday party, friends |
| June 2017 | Boy, girl, kindergarten, school play | Hanako-chan, school play, kindergarten |
| July 2017 | Boy, girl, pool, swimwear | Taro-kun, hanako-chan, pool, water play |
| August 2017 | Boy, girl, grandfather, grandmother, fireworks | Taro-kun, hanako-chan, grandfather, grandmother, fireworks |

Also in Table 2, a text string such as "boy" is stored corresponding to the subject, but it is preferable to store an image representing the subject. However, a text string may be stored. Any item of the subject included in the subject-word table in Table 2 corresponds to the combination of subjects included in respective images of the plurality of first images selected from the first image group, and any item of the word included in the subject-word table corresponds to information about the given text for the selected plurality of first images.

All the images captured in each month, such as the imaging year and month "May 2017", "June 2017", "July 2017", or "August 2017" illustrated in Table 2 correspond to the first image group, and the image selected in each month corresponds to the first image. However, neither the first image group nor the first image needs to make the month of an order and the month of the imaging year and month exactly correspond to each other. For example, the user may add images captured on the month and day around the month according to the order to the first image group and the first image.

Figure 11:
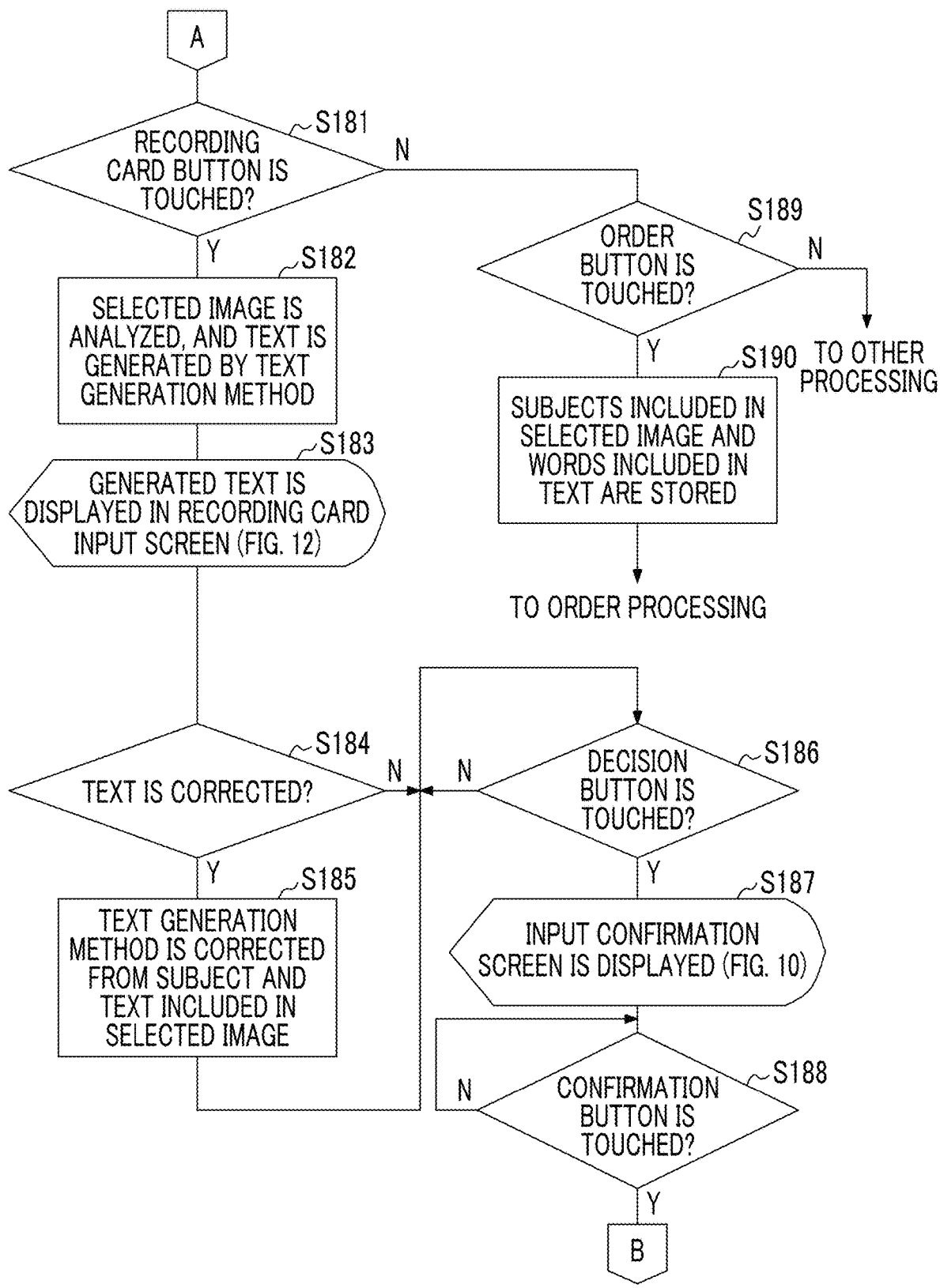
FIG. 11 is a flowchart illustrating a processing procedure of the smartphone.

FIG. 11 is a part of a flowchart illustrating processing procedure of the smartphone 1 and corresponds to the processing procedure of FIG. 4.

As illustrated in Table 2, as the number of the combinations of the subject and the word increases, it is possible to analyze the word to be used to generate text depending on the included subject. In this Example, in a case where an image is selected, text for the selected image is automatically generated, and the generated text is notified to the user.

The user can create the desired text by referring to the notified text.

In the text creation of present Example, machine learning using a method such as a neural network can be suitably used. First, in a learning stage, an input is set to the first image (for example, the 11 sheets of images described above), and an output is set to the text of the recording card. Then, a weighting of the neural network is changed using the user's order image as an input example and the text relating to the user's order as an exact output example. By collecting order data of one user over multiple months, a learned model dedicated to the one user may be generated. Also, by collecting order data of a plurality of users, a learned model applicable to the plurality of users may be generated. Next, in an estimation stage (in present Example, the text output corresponds), by inputting the first image (for example, the above-described 11 sheets of images) to the learned model as described above, it is possible to output the text for the recording card suitable for the first image. Furthermore, in a case where the text output in the estimation stage is corrected by the user, the corrected text can be used as a new exact output example in the learning stage.

In the above-described machine learning, more accurate text creation can be performed automatically by collecting a large number of order images from the user and the text relating to the order. For example, it is assumed that there is a festival that is performed only in a certain region and is not so famous, and is named "AAA Festival". It is assumed that a distinctive form of a portable shrine is used in the festival. It is assumed that a tourist who comes to the region for the first time takes a photo of this festival and uses the photo as the first image. In this case, in a case where local residents have already selected the above-described distinctive portable shrine as the first image by using present Example, and the word "AAA Festival" is included in the text, by the machine learning of present Example, even in a case where the above-described tourist does not know the name of the festival, the word "AAA festival" can be output in the text that is automatically output.

Furthermore, for information such as imaging date and time, and imaging location also capable of being used for input of machine learning, even in a case where there is no feature in a form that can be determined from an image, the name of the festival can be output in the text that is automatically output from the imaging date and time, imaging location, and a typical object that can be determined from the image (which is not special but can be determined to be a portable shrine, or the like).

However, for an image editing system according to present Example, which is set to have a particularly simple configuration, even in a case where the subject-word table as illustrated in Table 2 is not generated from the actually selected image and the input text, the table may be created in advance using a sample image or the like.

Figure 12:
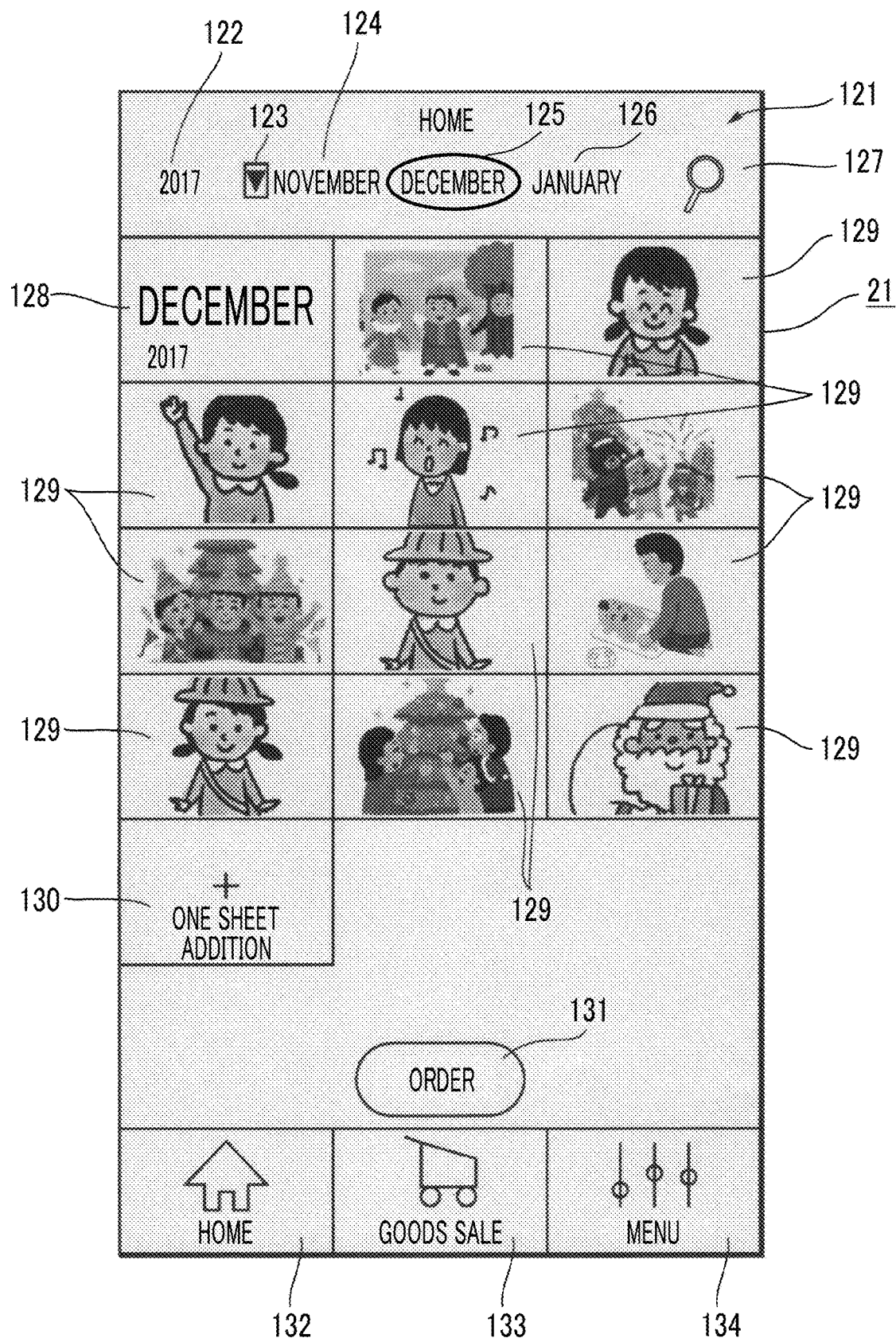
FIG. 12 is an example of a home screen.

FIG. 12 is an example of the display panel 21 of the smartphone 1.

In FIG. 12, the same reference numerals are given and the description is omitted to the same components as those illustrated in FIG. 8.

In the example illustrated in FIG. 12, since the text string of December 2017 is displayed in the imaging year and month display region 128, an image (which is an example of a second image) selected from the image (which is an example of a second image group) captured in December 2017 is displayed in the image display region 129. Thus, the imaging time of the first image group is different from the imaging time of the second image group. With reference to the subject-word table illustrated in Table 2, the generation of text representing the status of the image or the like selected from the image captured in December 2017 is performed as follows.

In a case where the recording card button is touched as described above (YES in step S181), the selected image (in this case, the image selected by the user among the images captured in December 2017 as illustrated in FIG. 12 and displayed in the image display region 129) is analyzed by the main control unit 100, and text is generated for the analyzed image by a predetermined text generation method (step S182). For example, a subject included in the selected image is extracted, a word stored corresponding to the extracted subject is extracted from Table 2, and text is generated using the extracted word. In a case where the subject includes "boy", "girl", "school play" (for example, a case where the curtain of school play is the subject), "kindergarten" (a case where a signboard with the name of the kindergarten is the subject, or the like), or the like, text "Taro-kun and Hanako-chan did a school play in a kindergarten." is generated. A list of words written as "Taro-kun, Hanako-chan, kindergarten, school play", rather than a sentence, may be used.

Figure 13:
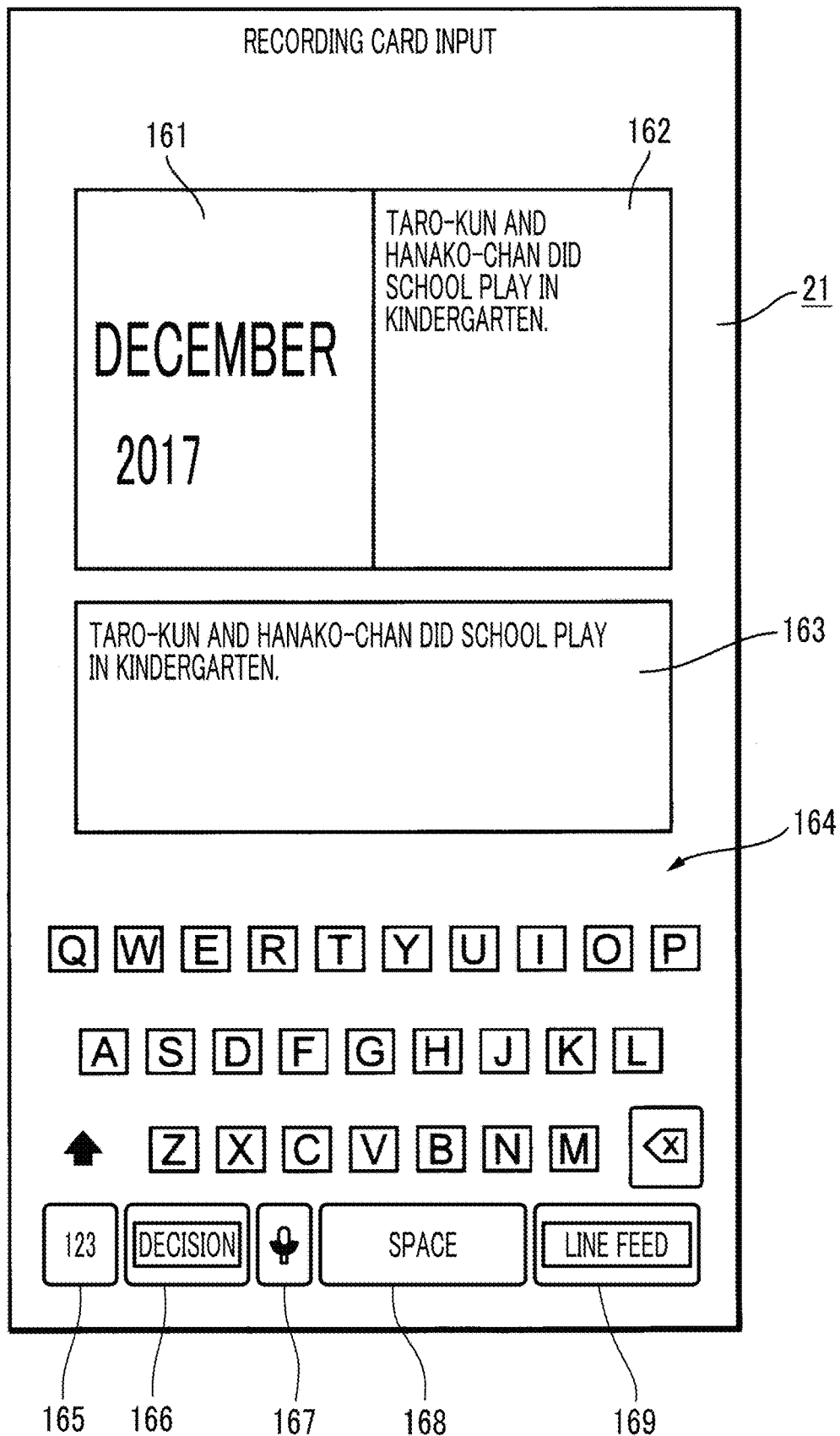
FIG. 13 is an example of a recording card input screen.

The recording card input screen is displayed on the display panel 21 and the generated text is displayed in the first text display region 162 and the second text display region 163 (which is an example of the text notifying device) (step S183). In FIG. 13, the text "Taro-kun and Hanako-chan did a school play in the kindergarten." is displayed. In a case where the user needs to confirm and correct the text displayed in the first text display region 162 and the second text display region 163, the user performs correction using the keypad (which is an example of the correction accepting device) formed in the keypad display region 164.

In a case where the text is corrected (YES in step S184), the text generation method is updated (step S185) by the main control unit 100 (which is an example of the updating device) from the combination of subjects included in the selected image and the corrected text (which is an example of information about the corrected text).

In a case where the input of the text is completed and the decision button 166 is touched (YES in step S186), an input confirmation screen as illustrated in FIG. 10 is displayed on the display panel 21 (step S187). In a case where the confirmation button 172 on the input confirmation screen is touched (YES in step S188), the home screen is displayed on the display panel 21, and in a case where the order button 131 is touched (YES in step S189), as described above, the subject included in the selected image and the word included in the text are stored in the subject-word table (step S190) as illustrated in Table 2 by the main control unit 100 (which is an example of the storage control device).

As the text generation method is updated, the generated text is more accurate.

Figure 14:
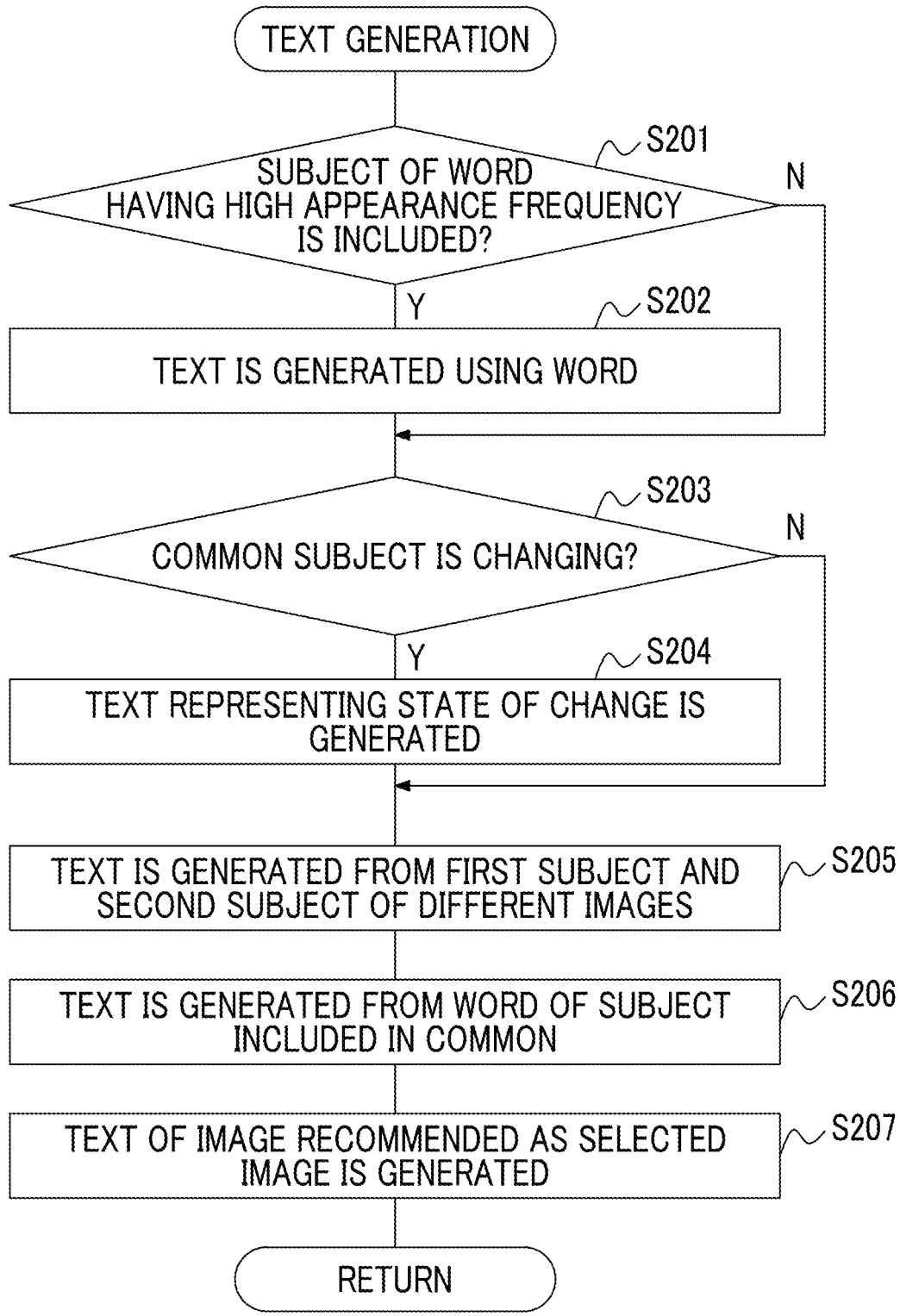
FIG. 14 is a flowchart illustrating a text generation processing procedure.

FIG. 14 is a flowchart illustrating the text generation processing procedure (the processing procedure of step S182 illustrated in FIG. 11).

First, among the words stored in the subject-word table illustrated in Table 2, in a case where there is a word appearing at a high frequency (a word at a threshold or higher) (YES in step S201), text is generated using the word (step S202). In a case where the appearance frequency of the word "festival" is high in the subject-word table, and a new image (which is an example of the second image, and for example, in a case of trying to create a recording card for an image captured in December 2017, an image selected from among the images captured in December 2017) for which text is to be generated also includes the subject represented by the word "festival", the text is generated using the word "festival".

In a case where a common subject is included in the images selected from the images at different imaging year and month, and the common subject is changing (YES in step S203), text representing the state of the change is generated (step S204). For example, as illustrated in FIG. 15, in a case where the image 211 is included in an image (which is an example of a first image) selected from images at a certain imaging year and month, and the image 212 is included in an image (which is an example of a second image) extracted from images at another imaging year and month, on the assumption that the subject included in the image 211 and the subject included in the image 212 are common, text representing a change in the common subject is generated. In the example illustrated in FIG. 15, since the image 211 is an image that the baby is "crawling" and the image 212 is an image that the baby is "standing by holding on to things", text "standing by holding on to things becomes possible" is generated. Regarding whether there is a common subject, the common subject may be determined as long as the subject-word table includes an image indicating a common subject, but it is also possible to perform a subject recognition on a common subject selected in the past, an image selected in the past, and a newly selected image to determine whether the subject is common.

Figure 16:
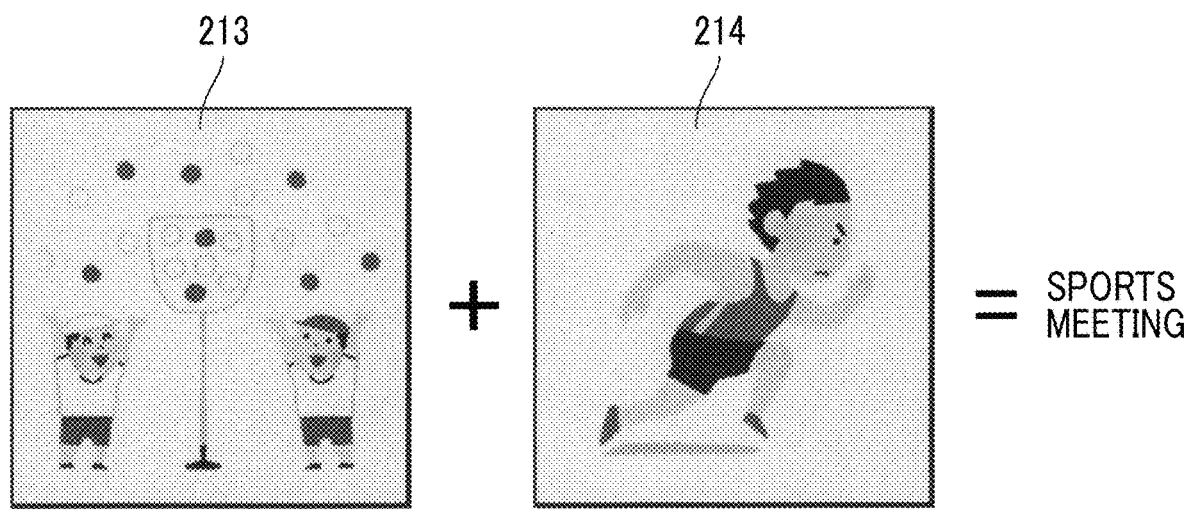
FIG. 16 is an example of an image.

In addition, text is generated from the first subject and the second subject of different images of the newly selected images (which is an example of the second image) (step S205). Referring to FIG. 16, in a case where an image 213 and an image 214 are included in the newly selected images, and are subjected to the image recognition, since the image 213 includes a subject of a basket of balls, a ball, and a child (which is an example of the first subject), the image 213 is analyzed as an image of a basket of balls, and since the image 214 includes a subject of a running person (which is an example of a second subject), the image 214 is analyzed as an image of a race. Then, text "sports meeting" is generated and notified to the user.

Furthermore, in a case where there is a subject commonly included in a plurality of images among the newly selected images (which is an example of the second image), text about the subject is generated (step S206). For example, in a case where the image of "Taro-kun" is commonly included in a plurality of images, text is generated using the information of "Taro-kun". Whether the subject is "Taro-kun" can be determined using the information stored in the subject-word table. For example, referring to Table 2, in a case where there is only one boy of the subject included in the selected image among the images captured in May 2017 and "Taro-kun" is stored as the corresponding word, the boy of the subject becomes "Taro-kun".

Figure 17:
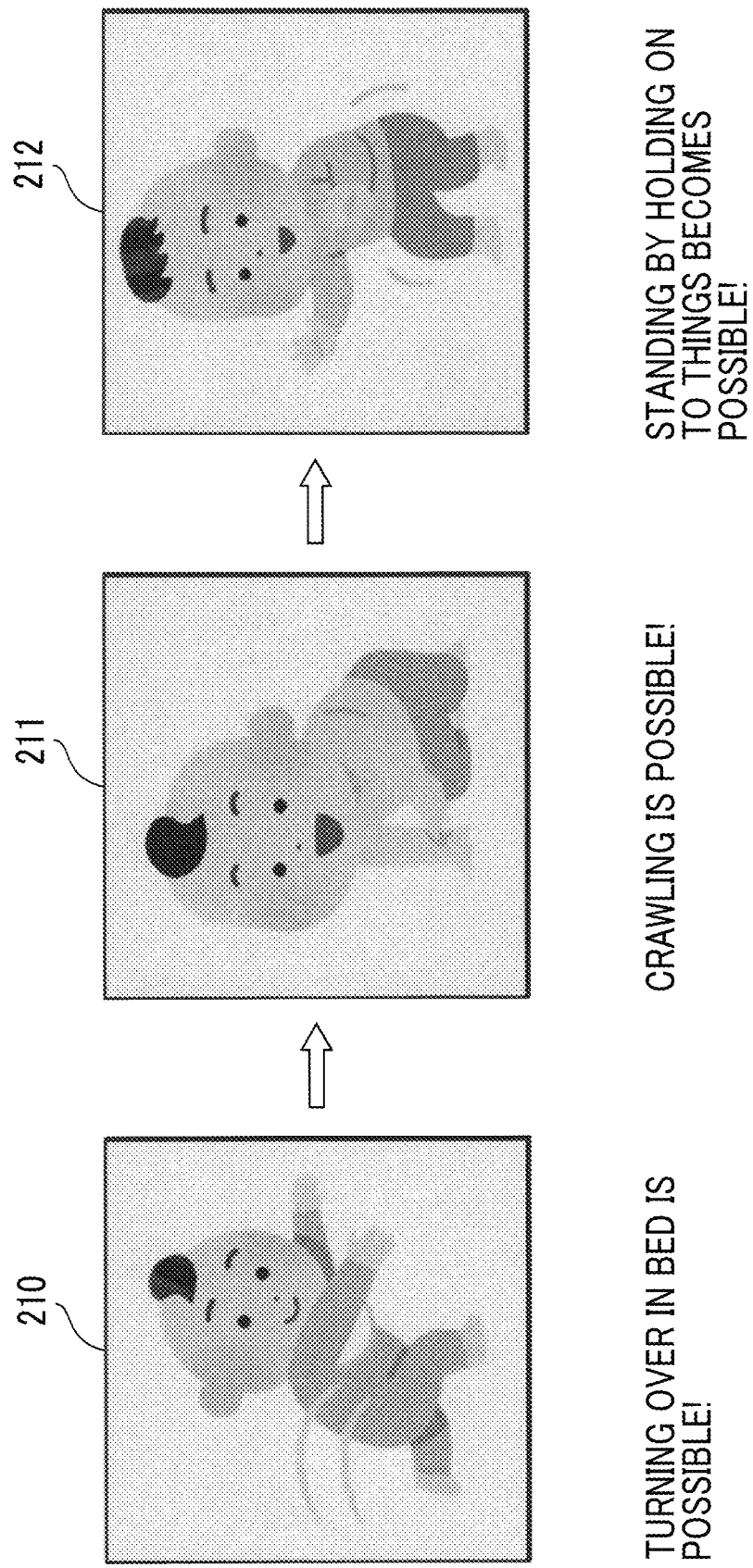
FIG. 17 is an example of an image.

Furthermore, in a case where the image 210 illustrated in FIG. 17 is included in the image (which is an example of the first image) selected from the images captured in a certain month and the image 211 illustrated in FIG. 17 is included in the image (which is an example of the second image) selected from the images captured in another month, it can be seen that a selection criterion is an image that shows a growth of the child. Then, the image 211 illustrated in FIG. 17 is recommended as an image (which is an example of a third image) to be selected from images (which are examples of a third image group) captured in yet another month. Similarly, in a case where there is a word appearing at a frequency equal to or higher than the threshold among the words stored in the subject-word table, an image including a subject represented by the word may be notified on an image selection screen (see FIG. 7) displayed on the display panel 21 (which is an example of the image notifying device) as the image to be selected from the images (which are examples of a third image group) captured in yet another month. For example, in order to distinguish from the other images among the images displayed on the image selection screen, notification is provided by displaying a thick frame.

In addition, in a case where "Turning over in bed is possible!" is input as the text of an image selected from images captured in a certain month including the image 210, "Crawling is possible." is input as the text of an image selected from images captured in another month including the image 211, and the image 212 illustrated in FIG. 17 is included in the images selected from the images captured in the month of each image, text "Standing by holding on to things becomes possible!" is created as the text of the image selected from the images captured in another month including the image 212. The text of the image to be recommended as the image to be selected in this way is generated (step S207). An image story can be detected based on the images selected in the past, and the story can be generated as text.

In a case where the text generated in this way and notified to the user is corrected, the text generation method is updated according to the correction. For example, although text, likely to include the subject of the word appearing at a high frequency, is generated (step S202), in a case where the word is corrected, the text is generated without using the word appearing at a high frequency. For the same subject being changing, although the text representing the state of change is generated (step S204), in a case where such text is corrected, the text representing the state of change is not generated. Similarly, although the text is generated from the first subject and the second subject of different images (step S205), in a case where such text is corrected, the text from the first subject and the second subject of different images is not generated. Although the text is generated from the word of the commonly included subject (step S206), in a case where such text is corrected, the text from the word of the commonly included subject is not generated, and although the text of the recommended image is generated (step S207), in a case where such text is corrected, the text from the recommended image is not generated. The text generation method is updated in this way. The generation of text is not limited to that shown in FIG. 14, and the text may be generated by other methods. In addition, even in a case where text generation is not performed in a certain method, text correction may be performed to generate text in an original method.

"An image showing changing of the same subject" may be determined as the "image showing changing of the same subject" by detecting a specific image such as "an image of a child turning over in bed", "an image of a crawling child", and "an image of a child standing by holding on to things" in advance. In this way, the text that represents the growth of the subject such as a child can be generated.

An abstract concept such as the "image showing changing of the same subject" may be determined using a separate learned model. As one example, in a typically used image search engine, a model for determining the "image showing growth of a child" can be learned by handling an image extracted by entering a keyword such as "child, growth, image" as an exact image of the "image showing growth of a child". As another example, in the program of present Example, a model for determining the "image showing changing of a subject" can be learned by causing the user to input a text message summarizing an image group in the month at the time of the order, setting order information related to all users as a search population, and handling an image in the month in which a text message including words of "child, growth, image" is input as an exact image of the "image showing changing of the subject".

As the text generation method is updated, the generated text is more accurate.

Figure 18:
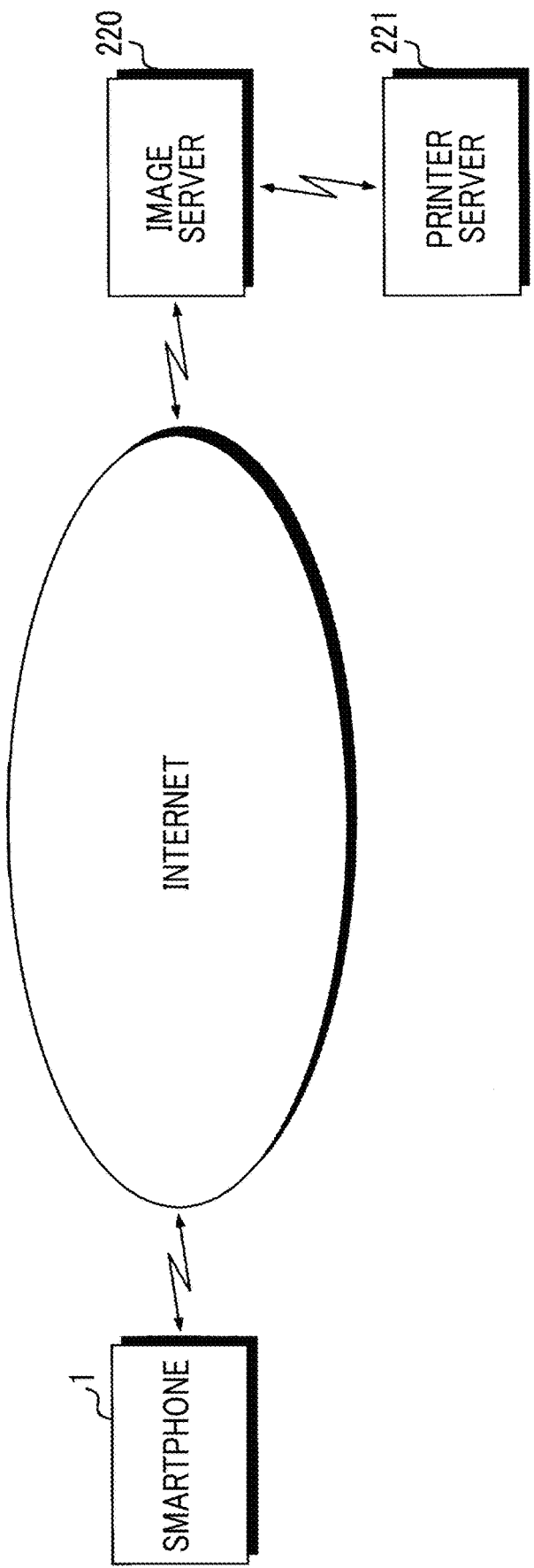
FIG. 18 illustrates an overview of an editing system.

FIG. 18 is an example of the image editing system.

The smartphone 1 and an image server 220 can communicate with each other through the Internet. Further, the image server 220 and a printer server 221 can communicate with each other.

As described above, image data representing the selected image and text data representing the input text are transmitted from the smartphone 1 to the image server 220. The image data and the text data are transmitted from the image server 220 to the printer server 221. In the printer server 221 (which is an example of the second image product creating device), printing of the selected image (for example, printing of 11 images) and printing of the text are performed, and these prints (which is an example of the image product) are mailed to the user.

Modification Example

Figure 19:
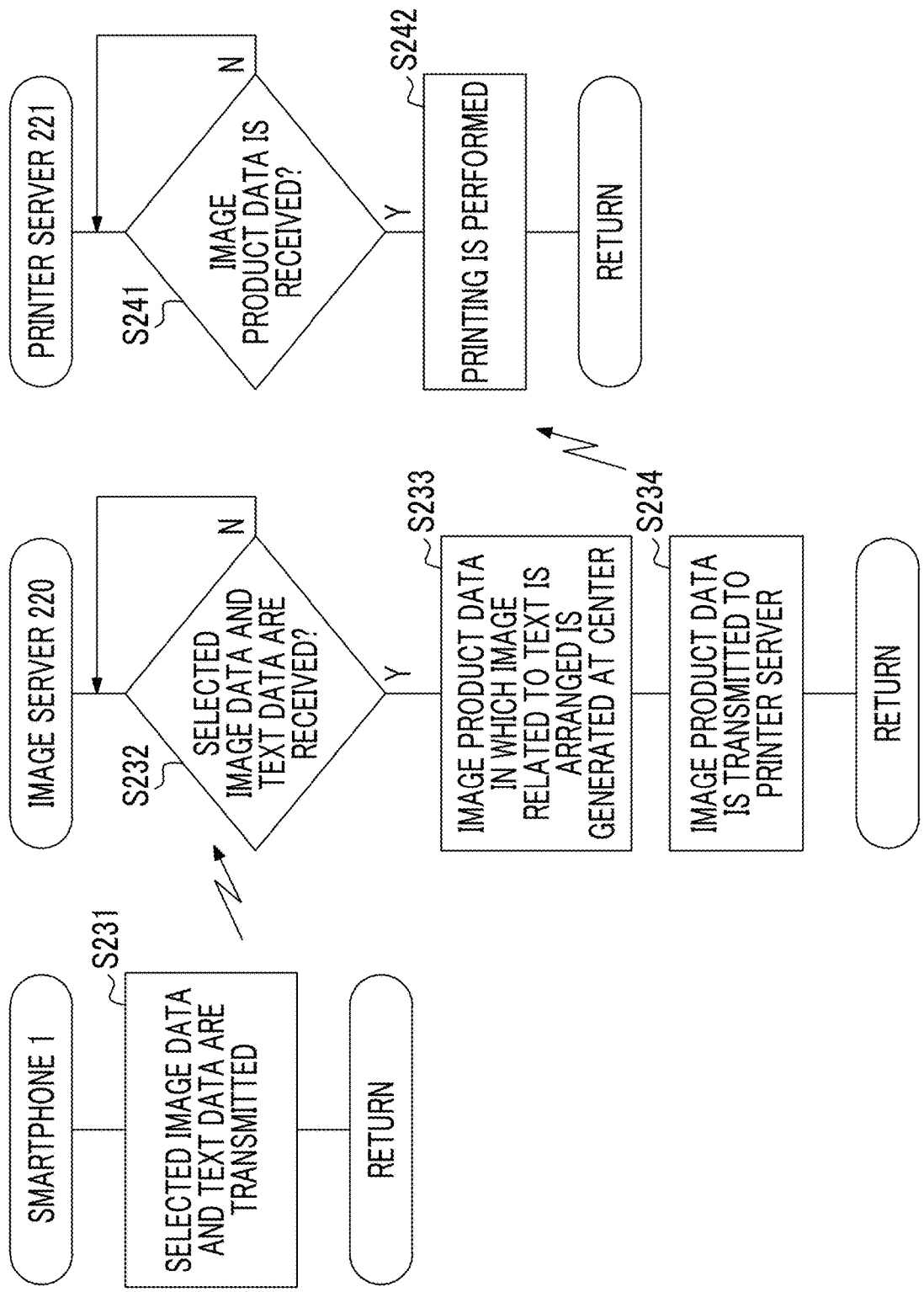
FIG. 19 is a flowchart illustrating a processing procedure of an image editing system.

FIG. 19 is an example of a flowchart illustrating a processing procedure of an image editing system.

As described above, image data representing the selected image and text data representing the input text are transmitted from the smartphone 1 to the image server 220. (step S231).

In a case where the image data and the text data transmitted from the smartphone 1 are received by the image server 220 (YES in step S232), image product data in which an image related to text represented by the text data among the images represented by the image data is arranged at the center and the other images are arranged around the image at the center to generate one print is generated at the image server 220 (step S233). The generated image product data is transmitted from the image server 200 to the printer server 221 (step S234).

In a case where the image product data is received by the printer server 221 (which is an example of the first image product creating device) (YES in step S241), printing is performed (step S242). The print is mailed to the user.

Figure 20:
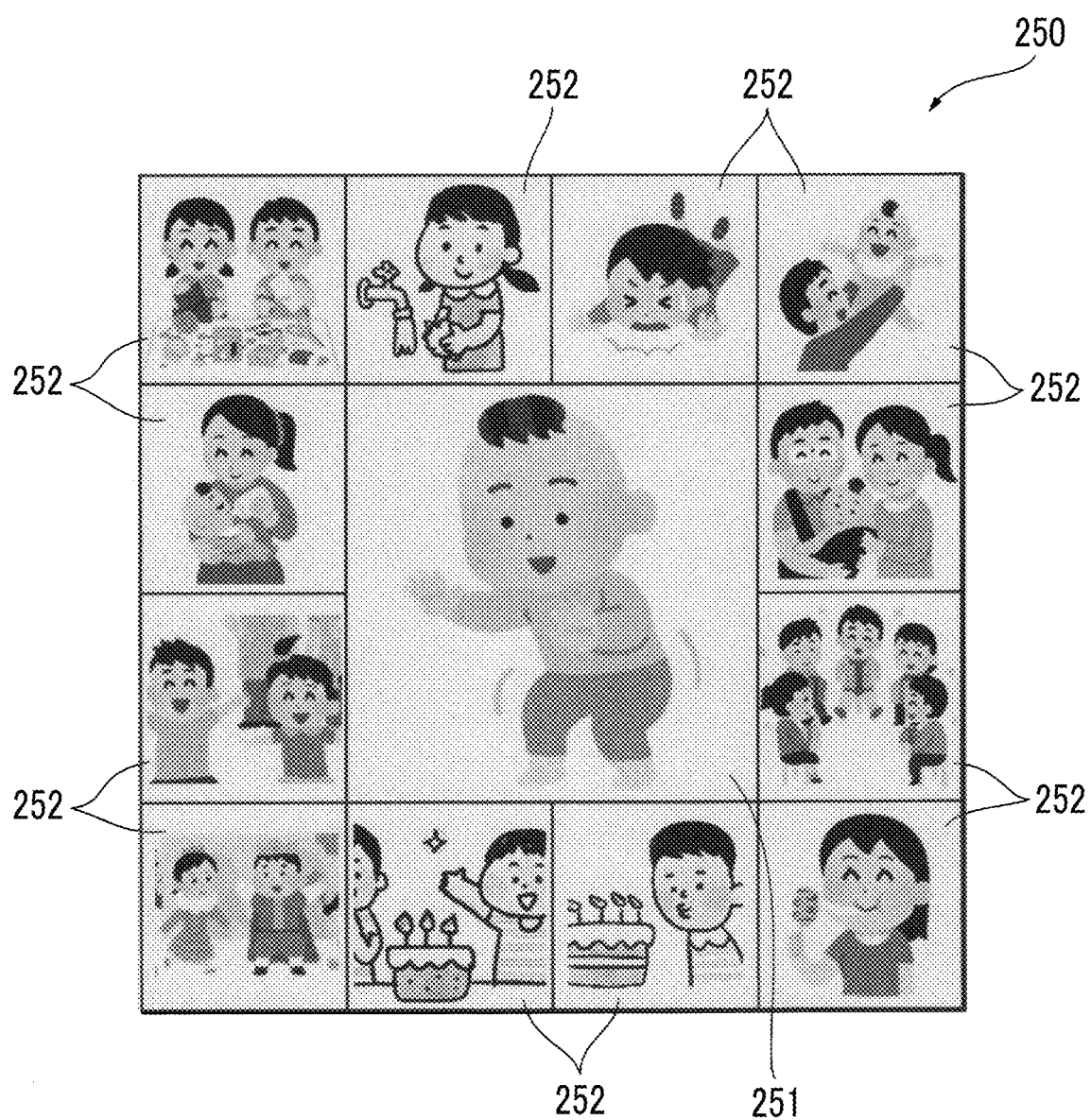
FIG. 20 is an example of an image product.

FIG. 20 is an example of the printed image product 250.

In a case where the text represented by the text data is, for example, "Taro-kun can stand by holding on to things!", then an image 251 at the center is the image 251 about standing by holding on to things related to the text, and the selected image 252 is arranged around the image 251. The text may be printed on a card or the like separate from the image product 250 and be mailed to the user. Also, the image related to the text may not necessarily be centered.

In the example illustrated in FIG. 19, although the image product data representing an image product 250 as illustrated in FIG. 20 is generated in the image server 220, the image product data may be generated in the main control unit 100 (an image product creating device) of the smartphone 1, and be transmitted from the smartphone 1 to the image server 220.

Moreover, in the above described Example, although the text is generated in the main control unit 100 of the smartphone 1 according to the text generation method, the text may be generated in the image server 220 or the like other than the smartphone 1. In that case, each time image selection, text input, or the like is performed, image data representing such images and text data representing text are transmitted to the image server 220, and the subject-word table illustrated in Table 2 or the like is stored in the image server 220. Image data representing a newly selected image is transmitted to the image server 220, the image server 220 generates text with reference to the stored subject-word table, and text data representing the generated text is transmitted from the image server 220 to the smartphone 1. The text data is received in the wireless communication unit 10 (which is an example of the reception device) of the smartphone 1, and the user is notified of the text represented by the received text data.

Since a lot of pieces of information is stored in the subject-word table stored in the image server 220, more accurate text can be generated.

While the smartphone 1 is used in the above described Example, a dedicated image processing apparatus, a personal computer, a tablet terminal, or the like other than the smartphone 1 can be used.

In addition, the image server 220 may comprise the text notifying device so that the text generation is performed in the image server 220 and the text data representing the generated text is transmitted from the image server 220 to provide the notification of the text. Furthermore, data representing text correction performed in the smartphone 1 may be received by the communication apparatus (which is an example of the correction accepting device) of the image server 220, and text correction may be performed in the image server 220. In this case, the subject-word table may be stored in memory of the image server 220 (which is an example of the storage device), and the CPU of the image server 220 (which is an example of the storage control device) may store information about the subject and information about the word described in the subject-word table. Furthermore, the text generation method may be updated by the CPU (which is an example of the updating device) of the image server 220.

Processing units executing the above processing include not only the main control unit 100 functioning as various processing units by executing software but also a programmable logic device such as a field-programmable gate array (FPGA) capable of changing a circuit configuration after manufacturing, a dedicated electric circuit such as an application specific integrated circuit (ASIC) as a processor having a circuit configuration dedicatedly designed to execute a specific process, and the like.

One processing unit may be configured with one of the various processors or with a combination of the same or different types of two or more processors (for example, a plurality of FPGAs, a combination of a CPU and an FPGA). As an example in which a plurality of processing units are configured with one processor, first, there is an aspect in which one processor is configured with a combination of one or more CPUs and software, and this processor functions as a plurality of processing units, as represented by a computer such as a client computer or a server. Second, there is an aspect in which a processor that realizes a function of the entire system including a plurality of processing units using one integrated circuit (IC) chip is used, as represented by a system-on-chip or the like. Thus, the various processing units are configured with one or more processors as a hardware structure.

Furthermore, the hardware structure of the various processors is more specifically an electric circuit obtained by combining circuit elements such as semiconductor elements.

What is claimed is:

1. An image processing apparatus comprising:
a text notifying device for providing a notification of text given to a plurality of second images selected from a second image group, the text being generated by a text generating device based on a text generation method, referring to a storage device in which a combination of subjects included in each image of a plurality of first images selected from a first image group and information about text given with respect to the plurality of selected first images are stored in relation to each other;
a correction accepting device for accepting a correction of text notified by the text notifying device;
a storage control device for relating a combination of subjects included in each image of the plurality of second images with information about text accepted and corrected by the correction accepting device, and storing the resultant in the storage device; and
an updating device for updating the text generation method based on the combination of the subjects included in each image of the plurality of second images and the information about the text accepted and corrected by the correction accepting device.

2. The image processing apparatus according to claim 1, wherein in a case where the plurality of second images include an image including a subject represented by a word which appears at a frequency equal to or higher than a threshold, among words included in the information about the text stored in the storage device, the text generating device generates text to be given to the plurality of second images based on the word which appears at the frequency equal to or higher than the threshold.

3. The image processing apparatus according to claim 1, further comprising:
an image notifying device for, in a case where a third image group includes an image including a subject represented by a word which appears at a frequency equal to or higher than a threshold, among words included in the information about the text stored in the storage device, providing a notification of the image including the subject as an image to be selected from the third image group.

4. The image processing apparatus according to claim 1, wherein in a case where the plurality of second images include the same subject as the subject included in the plurality of first images and the same subject changes, the text generating device generates text representing a state of a change of the same subject.

5. The image processing apparatus according to claim 1, wherein the text generating device generates text to be given to the plurality of second images based on information about text related to a first subject and a second subject included in different images among the plurality of second images.

6. The image processing apparatus according to claim 1, wherein the text generating device generates text to be given to the plurality of second images based on information about text related to a subject commonly included in a plurality of images among the plurality of second images.

7. The image processing apparatus according to claim 6, further comprising:
an image product creating device for arranging at least one of the plurality of images at a center and creating an image product for the plurality of second images.

8. The image processing apparatus according to claim 1, wherein the text generating device generates text to be given to a plurality of third images recommended as an image to be selected from a third image group with selection criterion based on the first image and the second image.

9. The image processing apparatus according to claim 1, wherein imaging times of the plurality of first images are different from imaging times of the plurality of second images.

10. The image processing apparatus according to claim 1, further comprising:
an image product creating device for creating image products for the plurality of first images and the plurality of second images.

11. The image processing apparatus according to claim 1, further comprising:
the text generating device.

12. The image processing apparatus according to claim 1, further comprising:
a reception device for receiving data representing text generated by the text generating device,
wherein the text notifying device provides a notification of text represented by the data received by the reception device.

13. The image processing apparatus comprising:
a processor, the processor may perform:
providing a notification of text given to a plurality of second images selected from a second image group, the text being generated by a text generating device based on a text generation method, referring to a storage device in which a combination of subjects included in each image of a plurality of first images selected from a first image group and information about text given with respect to the plurality of selected first images are stored in relation to each other;
accepting a correction of text which is notified;
relating the combination of the subjects included in each image of the plurality of second images with information about text accepted and corrected, and storing the resultant in the storage device; and
updating the text generation method based on the combination of the subjects included in each image of the plurality of second images and the information about the text accepted and corrected.

14. An image processing method comprising:
providing a notification, by a text notifying device, of text given to a plurality of second images selected from a second image group, the text being generated by a text generating device based on a text generation method, referring to a storage device in which a combination of subjects included in each image of a plurality of first images selected from a first image group and information about text given with respect to the plurality of selected first images are stored in relation to each other;
accepting, by a correction accepting device, a correction of text notified by the text notifying device;
relating, by a storage control device, a combination of subjects included in each image of the plurality of second images with information about text accepted and corrected by the correction accepting device, and storing the resultant in the storage device; and
updating, by an updating device, the text generation method based on the combination of the subjects included in each image of the plurality of second images and the information about the text accepted and corrected by the correction accepting device.

15. A non-transitory recording medium storing a computer-readable program for controlling a computer of an image processing apparatus to perform:
- providing a notification of text given to a plurality of second images selected from a second image group, the text being generated by a text generating device based on a text generation method, referring to a storage device in which a combination of subjects included in each image of a plurality of first images selected from a first image group and information about text given with respect to the plurality of selected first images are stored in relation to each other;
- accepting a correction of text notified by a text notifying device;
- relating the combination of the subjects included in each image of the plurality of second images with information about text accepted and corrected in a correction accepting device, and storing the resultant in the storage device; and
- updating the text generation method based on the combination of the subjects included in each image of the plurality of second images and the information about the text accepted and corrected in the correction accepting device.

* * * * *